Sept. 27, 1966  R. W. REYNOLDS ETAL  3,274,855
STARTER-DRIVE SYSTEM
Filed June 19, 1962  11 Sheets-Sheet 1
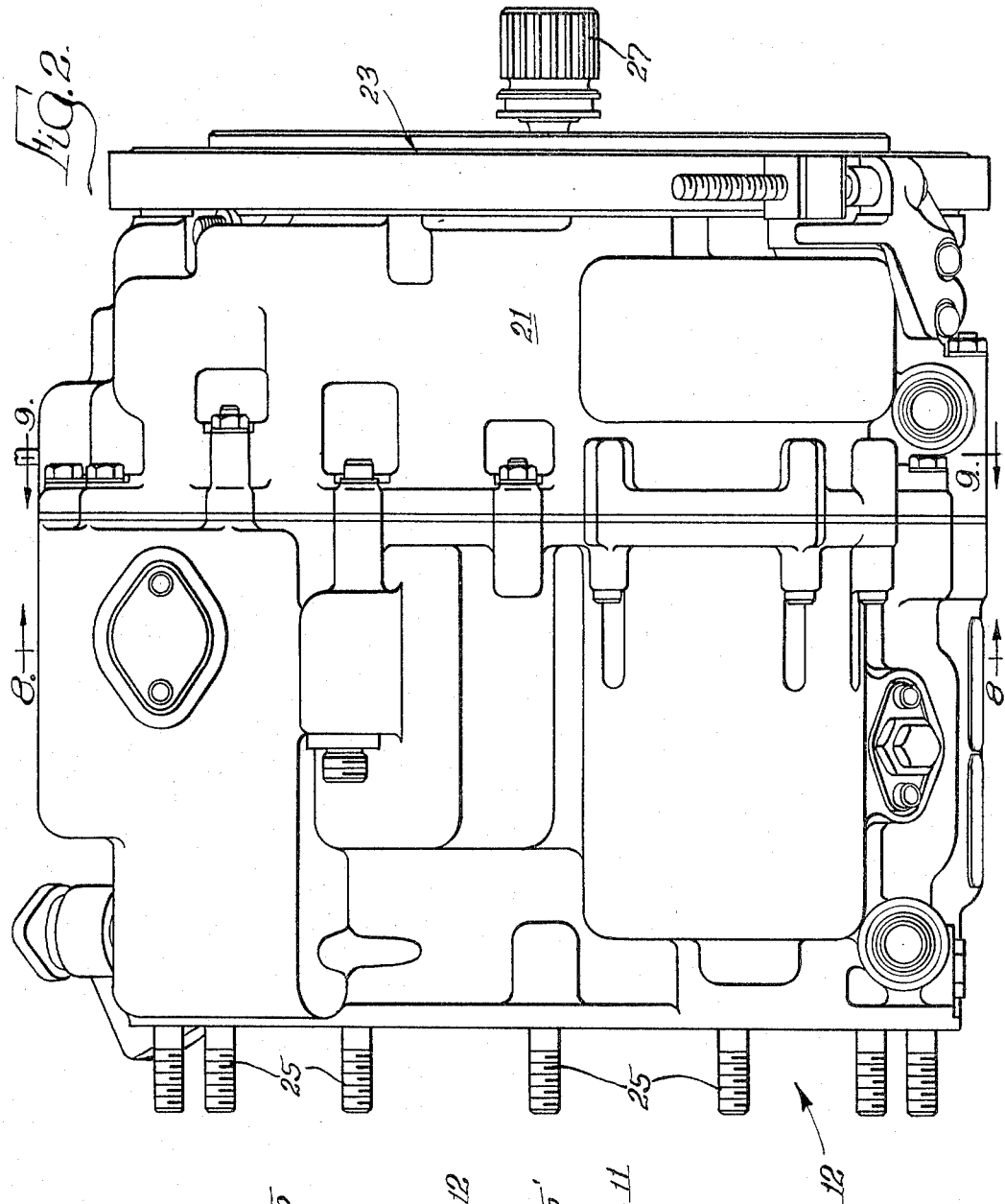
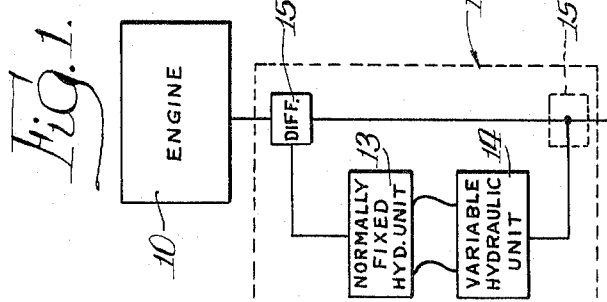
Inventors:—
Richard W. Reynolds,
Louis Ross,
Charles J. Gantzer
BY Hofgren, Brady
Wegner, Allen & Stellman
Atty's.

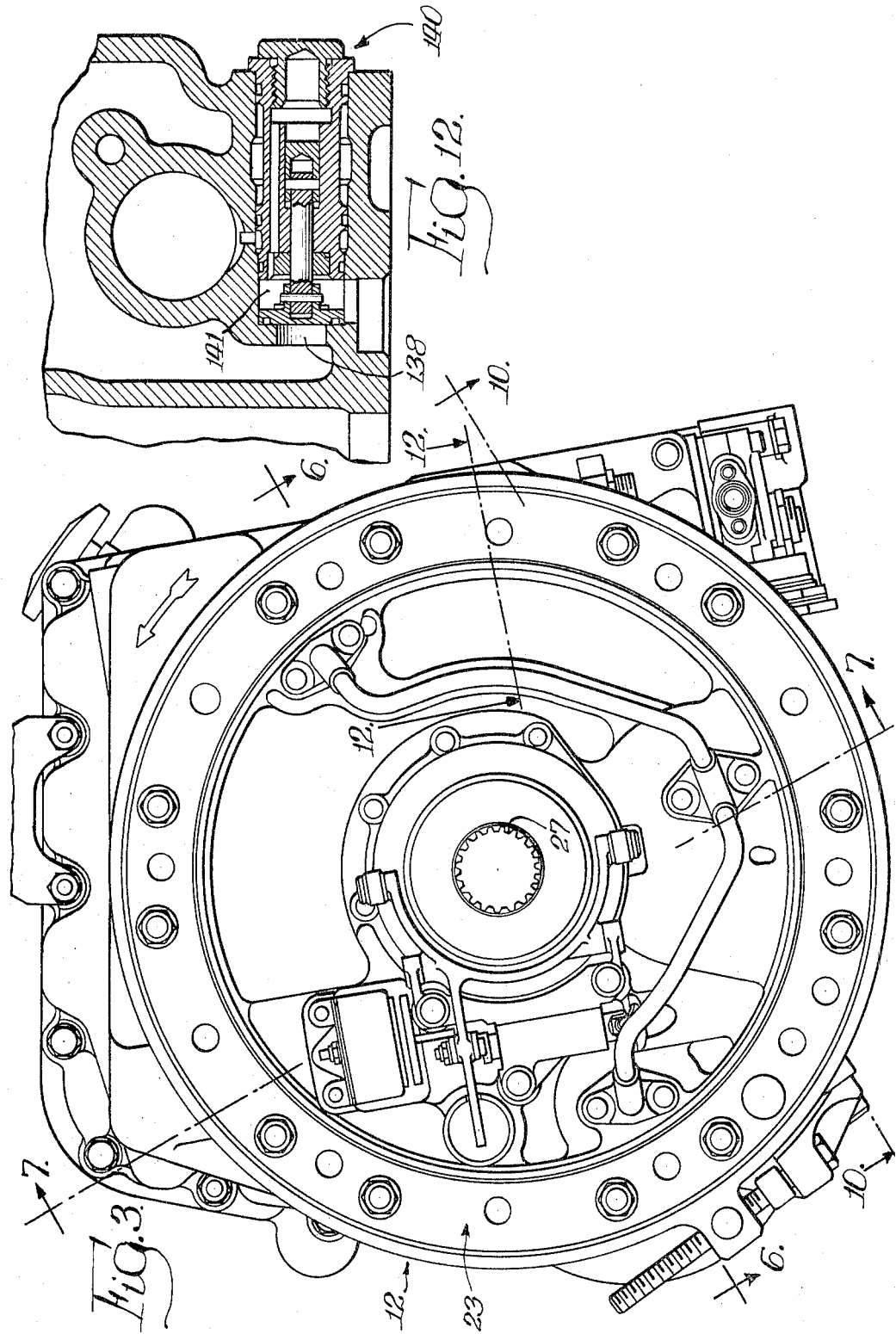

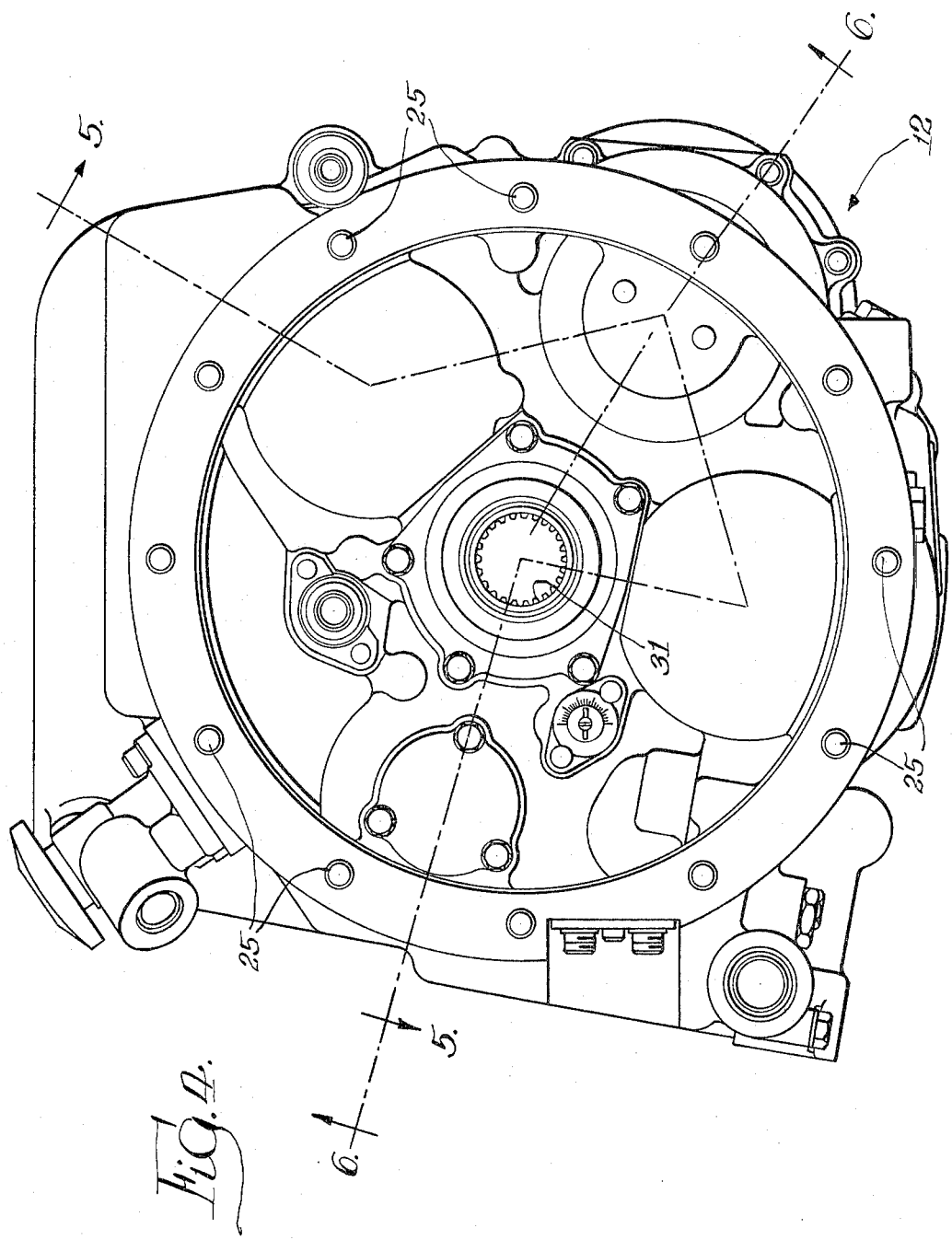

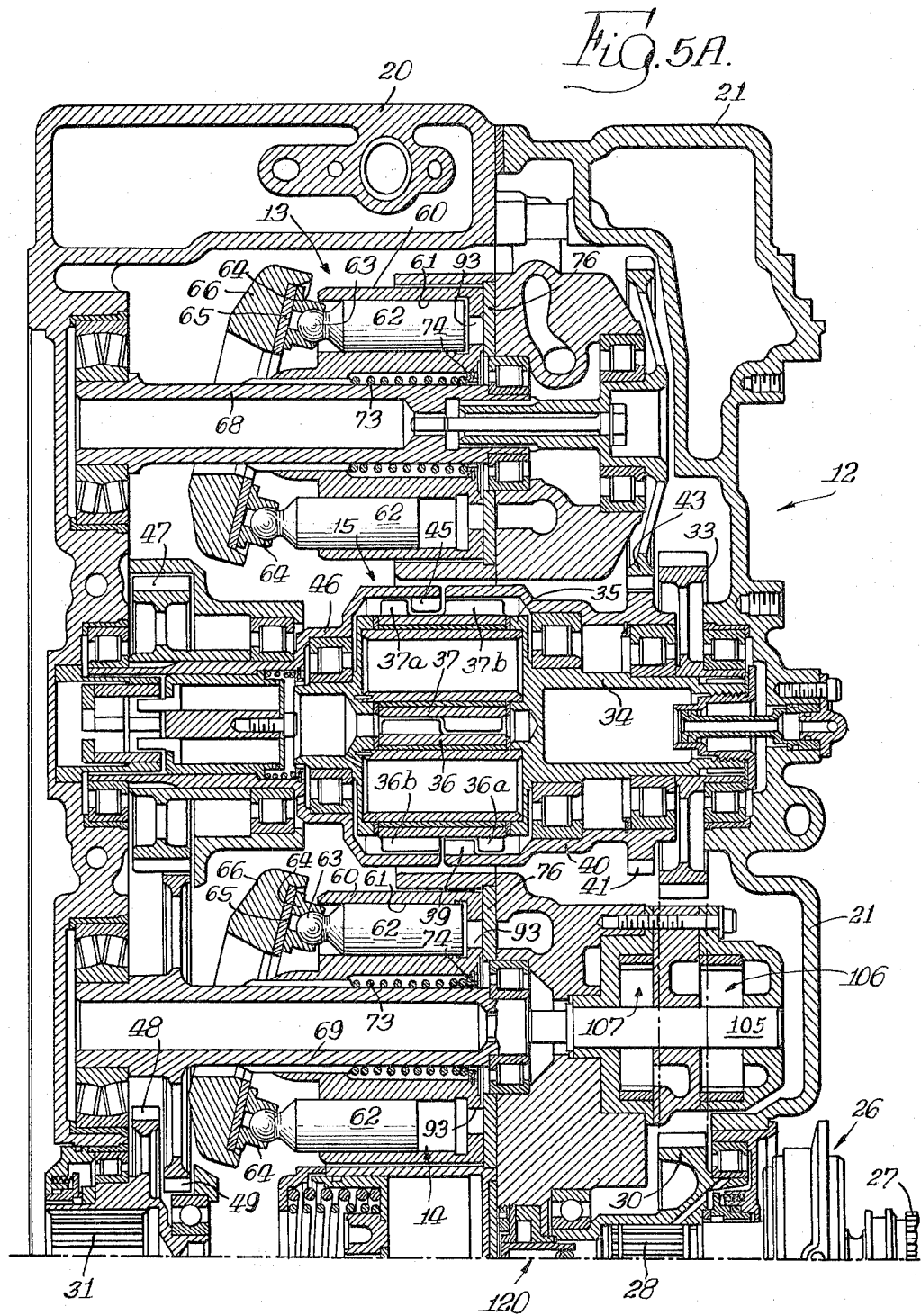

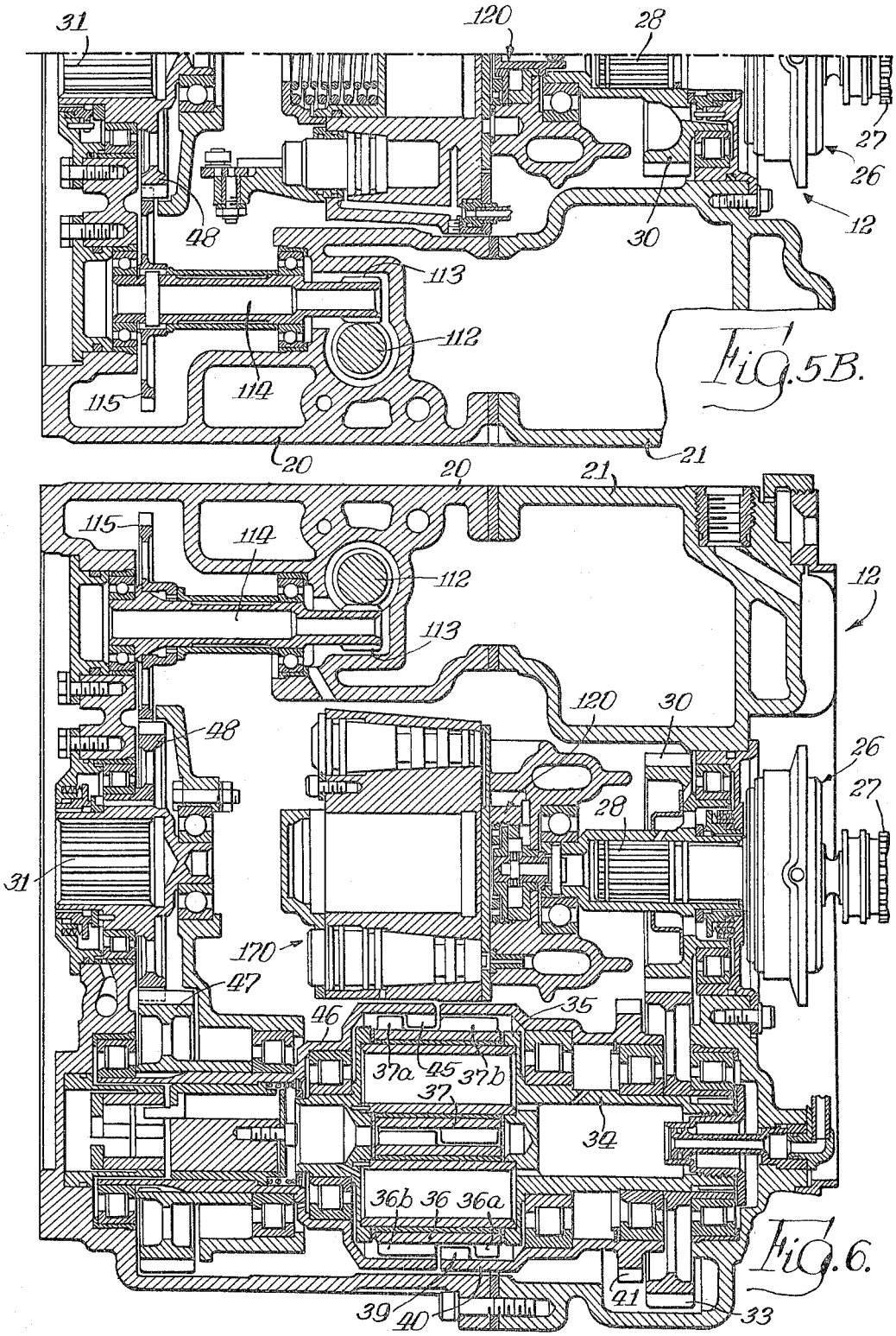

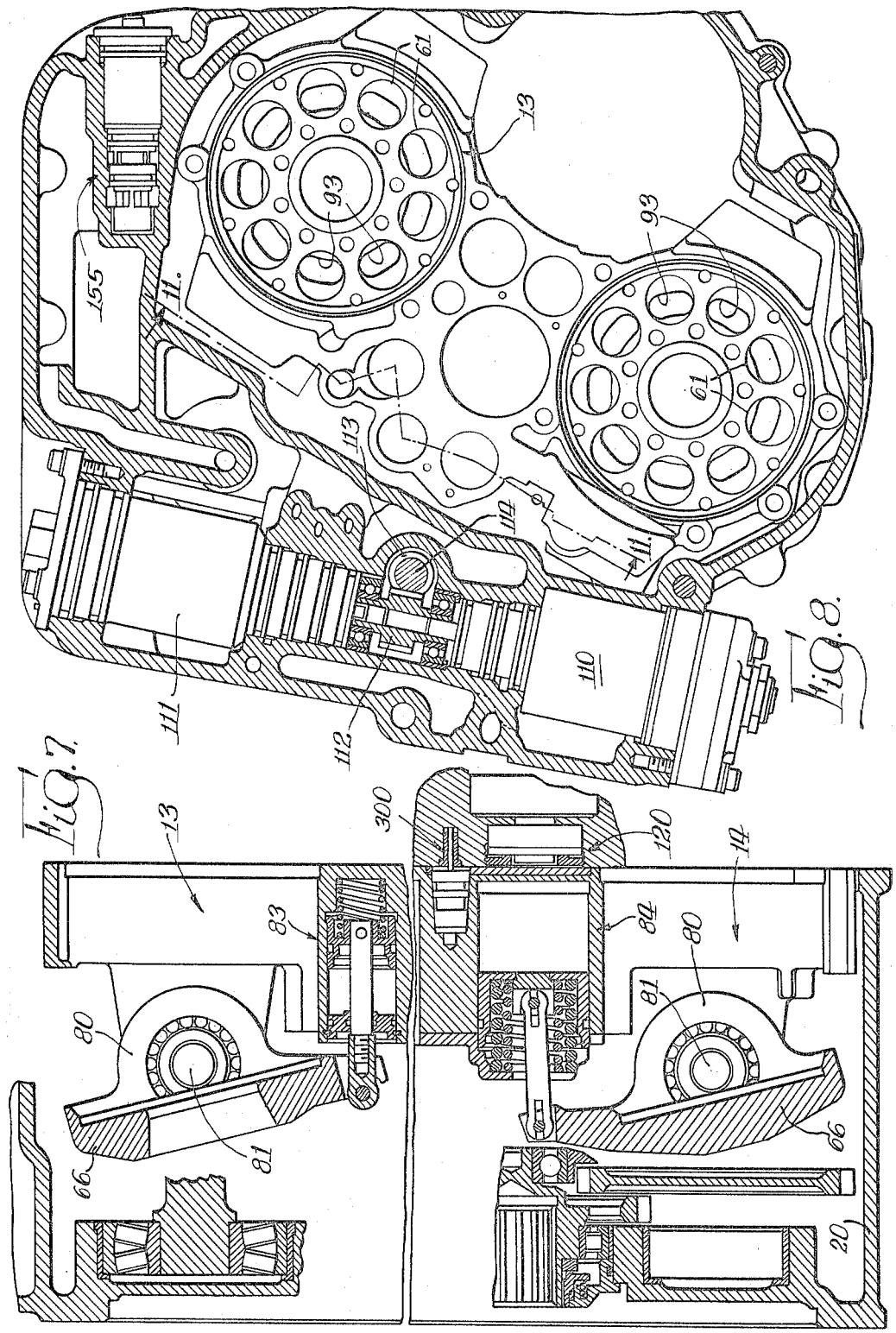

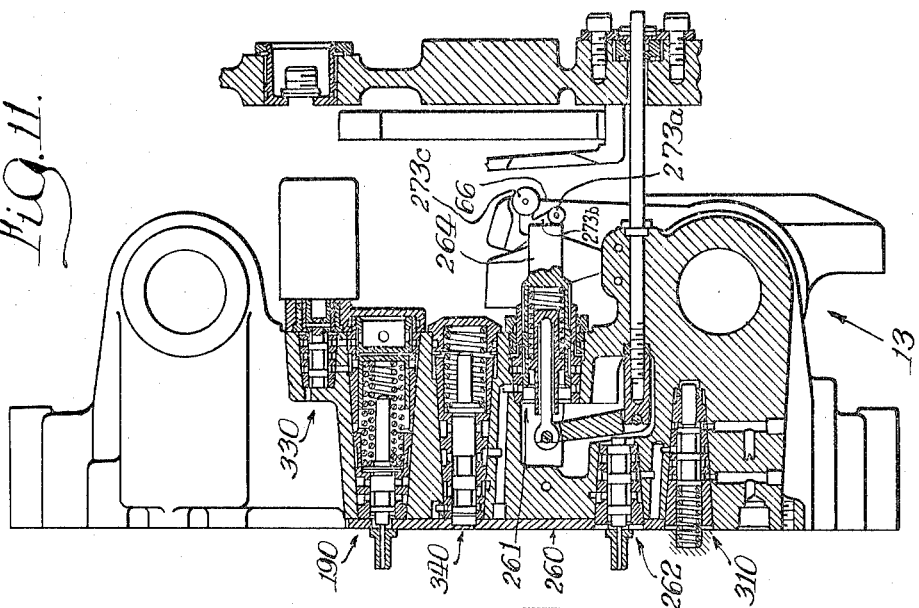
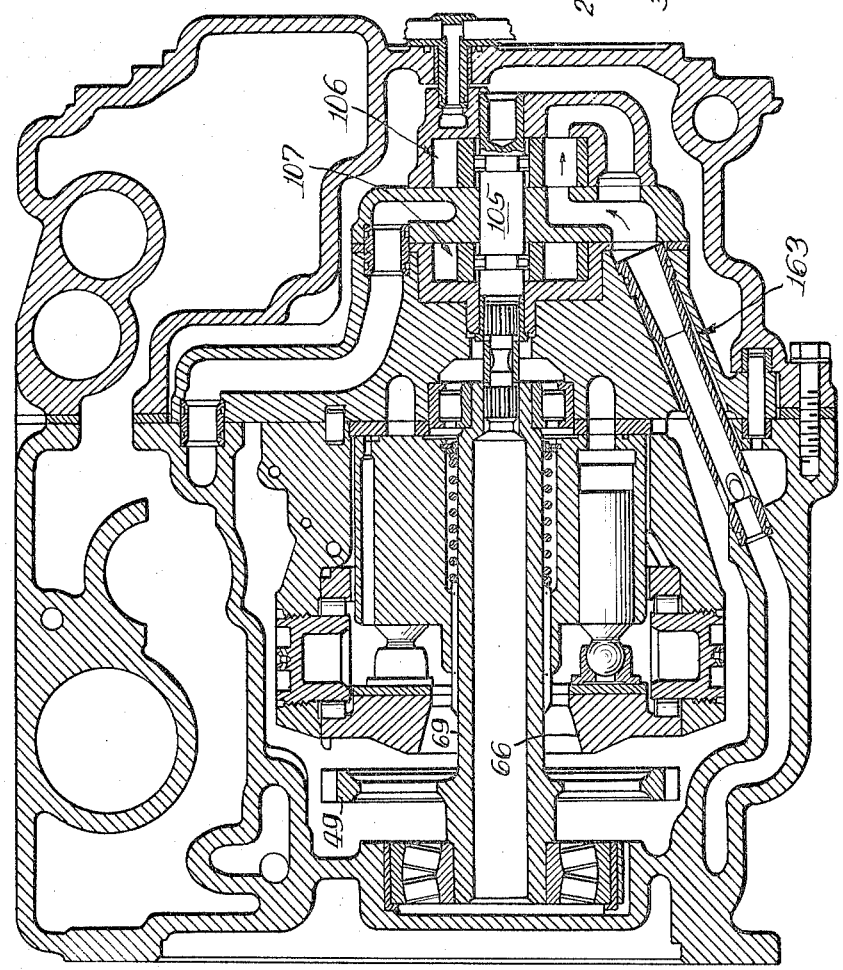

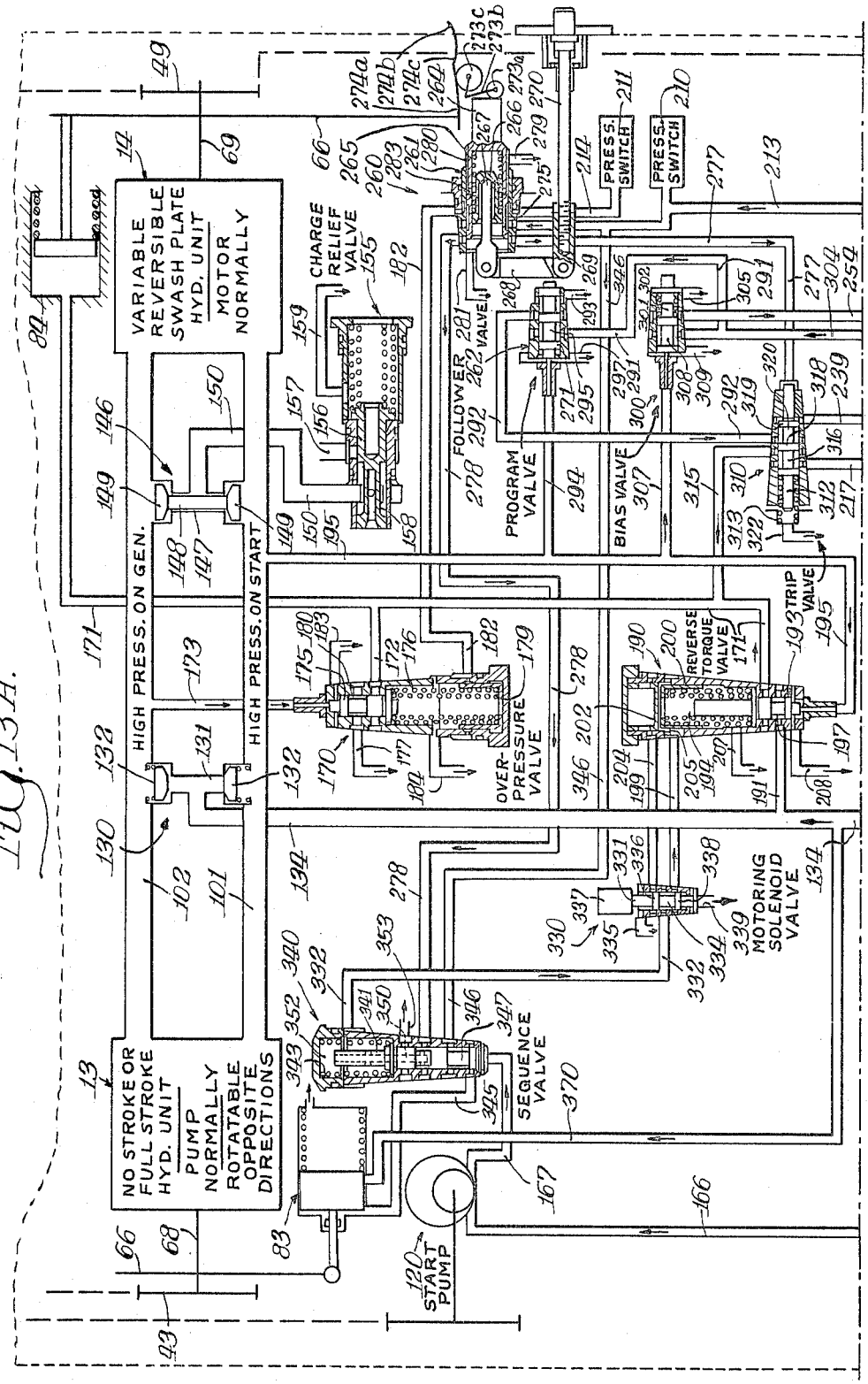

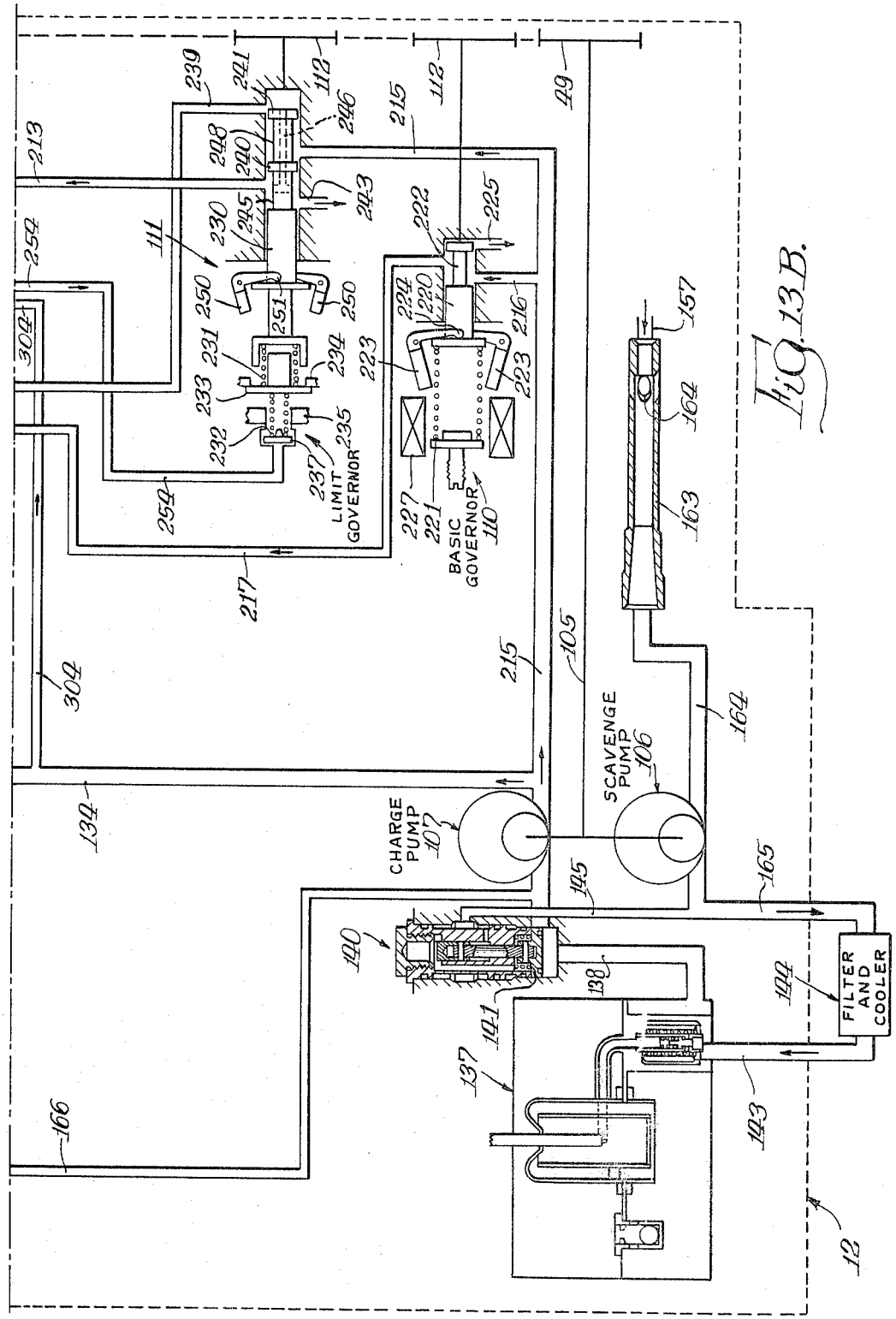

United States Patent Office 3,274,855
Patented Sept. 27, 1966

3,274,855
STARTER-DRIVE SYSTEM
Richard W. Reynolds, Louis Ross, and Charles J. Gantzer, Rockford, Ill., assignors to Sundstrand Corporation, a corporation of Illinois
Filed June 19, 1962, Ser. No. 203,519
40 Claims. (Cl. 74—687)

This invention relates to a drive unit, and more particularly a hydraulic unit with a mechanical differential, especially adapted for use in aircraft, intervening an aircraft engine and an alternator normally driven by the engine while the aircraft is in operation, for transmitting power from the engine to the generator to drive the latter at a constant speed regardless of variations in engine speed and load, and alternatively, for transmitting power from the generator to the engine when the generator is operated as a motor for purposes of starting the engine.

It is a general object of the invention to provide a new and improved drive unit of the type described.

Another object is to provide a new and improved drive of the type described including a novel relationship of hydraulic transmission and gear differential.

A more specific object is to provide a new and improved drive of the character described comprising a differential including a generator connectible shaft, an engine connectible shaft, gearing interconnecting the shafts for purposes of driving one from the other and a control gear connected with said interconnected gearing for varying the rate of rotation of one of said shafts relative to the other and a hydraulic transmission including a pump driven by said control gear and a motor connected by gearing to the generator connectible shaft.

A further object is to provide new and improved control means for a transmission of the character mentioned, including means for maintaining the pump and motor at zero displacement while the generator connectible shaft is brought up to a predetermined speed, whereupon the pump and motor are placed at maximum displacement.

It is also an object to provide new and improved control means for controlling the displacement of the hydraulic motor after the generator connectible shaft attains said predetermined speed in response to pressure in the high pressure conduit connecting the pump and the motor.

Another object is to provide new and improved control means including speed sensitive means for controlling displacement of the motor while the engine connectible shaft drives the generator connectible shaft, and means for isolating the speed sensitive means while the generator connectible shaft drives the engine connectible shaft.

Other objects and advantages will become readily apparent from the following detailed description taken in connection with the accompanying drawings, in which:

FIG. 1 is a diagrammatic view illustrating the relationship of engine, generator, differential and hydraulic units to each other;

FIG. 2 is a front elevational view of a constant speed drive unit including differential and hydraulic units as well as the various control means;

FIG. 3 is a right end elevational view of the unit shown in FIG. 2;

FIG. 4 is a left end elevational view of the unit shown in FIG. 2;

Figure 9:
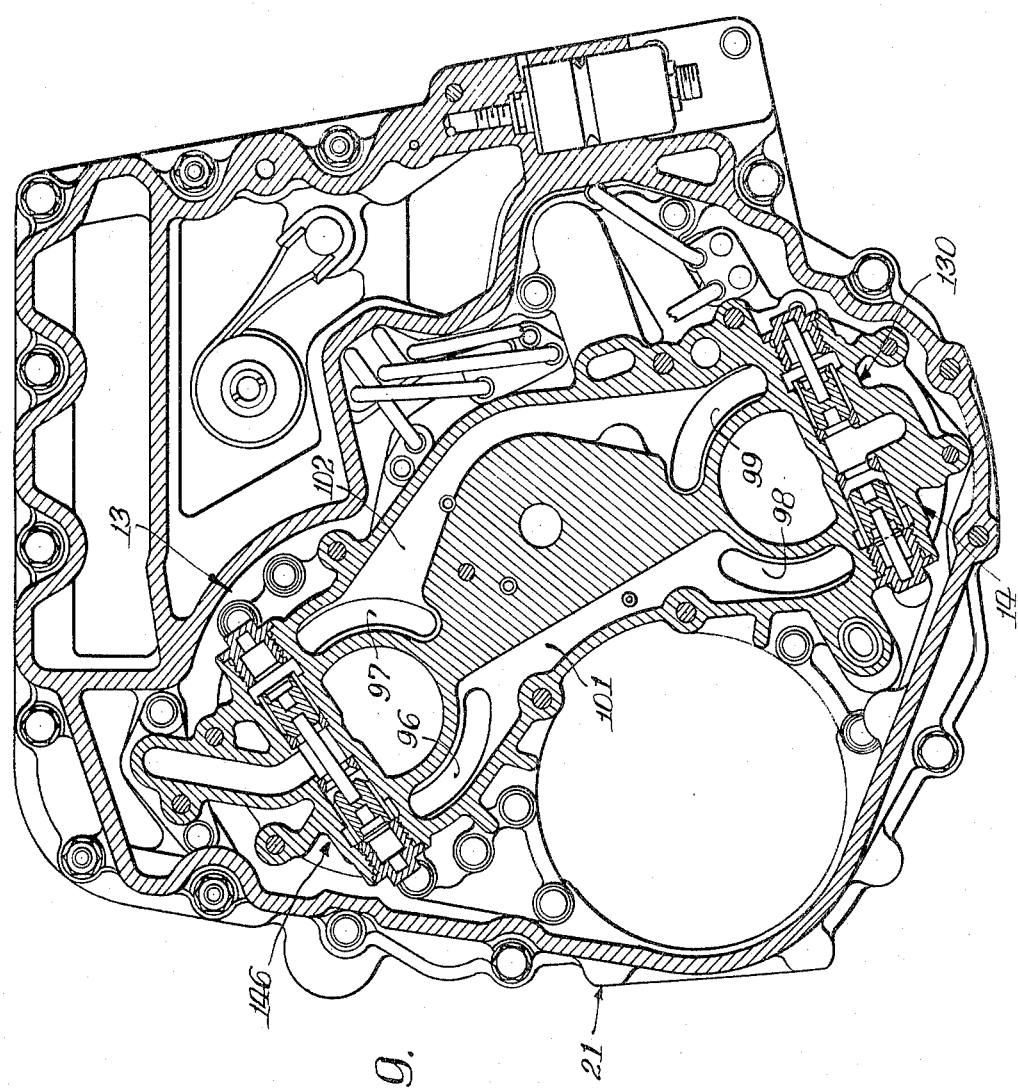
Figure 10:
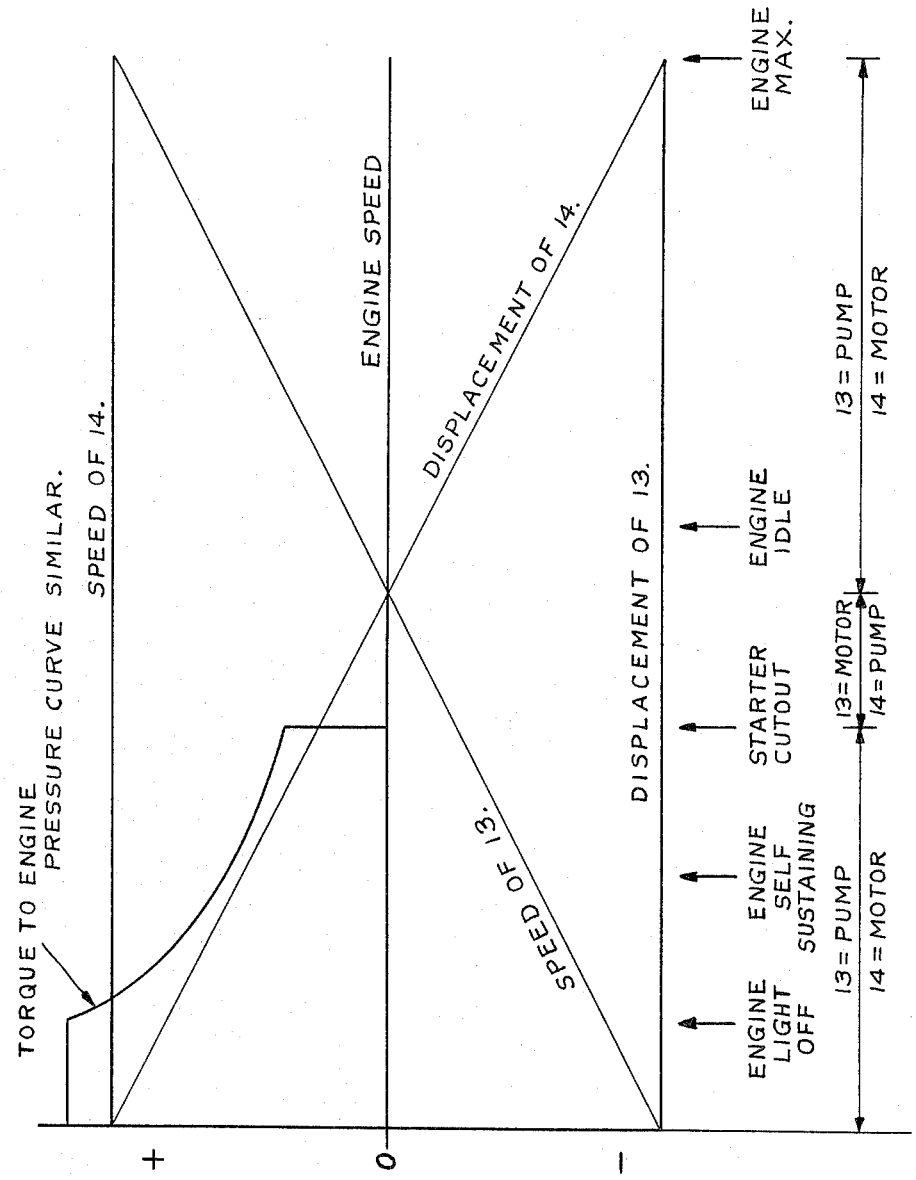

FIGS. 5A and 5B constitute an irregular sectional view taken at about the line 5—5 of FIG. 4;

FIG. 6 is a sectional view taken at about the line 6—6 of FIG. 3;

FIG. 7 is a sectional view taken at about the line 7—7 of FIG. 3, with parts visible on such line being omitted in order to more clearly show other features;

FIG. 8 is a sectional view taken about the line 8—8 of FIG. 2;

FIG. 9 is a sectional view taken on the line 9—9 of FIG. 2;

FIG. 10 is a sectional view taken on the line 10—10 of FIG. 3;

FIG. 11 is a fragmentary sectional view taken about the line 11—11 of FIG. 8;

FIG. 12 is a fragmentary sectional view taken at about the line 12—12 of FIG. 3;

FIGS. 13A and 13B constitute a diagrammatic view illustrating the hydraulic circuitry with associated elements and with the various control means positioned as they would be during starting when the generator is functioning as an induction motor while attaining its synchronous speed; and FIG. 14 is a graph illustrating diagrammatically the operation of the system, particularly during startup.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

By way of introduction, engine starting in commercial aircraft has passed through a number of phases, dictated primarily by the amount of power required to crank the engines and the type of power available to meet the requirement.

Earlier transport aircraft required relatively low levels of cranking power, and having direct current electrical systems, usually had sufficient battery capacity to permit the use of a direct current motor for starting. If it was desirable to protect the aircraft batteries from the heavy starting drain, a ground power cart was furnished to provide direct current power for starting, as well as to provide power to the aircraft on the ramp before starting, to maintain other systems at readiness.

Modern electrical power demands have dictated a change in aircraft systems to alternating current power. At the same time the growth of engines has required greater cranking torques, to an extent such that a direct current motor carried only for engine starting was a severe weight penalty.

This led to the development of other sources of cranking power for engine starting which would be powerful enough to meet the engine requirements and yet reduce the weight penalty to the aircraft to a minimum, such as, for example, starting motors carried by ground carts.

However, with the advent of the aircraft utilizing alternating current electrical systems, with very high installed generating capacity, the requirement for an even larger capacity alternating current ground power cart has developed, to provide ramp power for operation of essential services during station stops.

According to the present invention, the redundancy of starting power equipment has been eliminated, and use is made of the installed generators in the aircraft as starter motors for starting the aircraft engines. The generator is accelerated to synchronous speed, as an induction motor, with little or no connected load in order to limit the internal heating of the generator. Once at synchronous speed, the generator, operating as a synchronous motor, delivers power for engine cranking. The power is programmed by an infinitely variable torque multiplier, namely, a hydrostatic transmission. Depending upon parameters of engine torque, speed range, and electrical load, the hydraulic transmission may vary in configuration. A preferred embodiment is described herein.

The transmission provides a high degree of flexibility required for transmitting controlled torque in either direction. It provides for engine starting from a 400 cycles per second 115 volt supply for engines up to the 10,000 pound thrust class, and constant speed generator drive for a 400 cycles per second alternating current generating power system of 30–40 k.v.a. unit capacity. In the starting mode, power is applied to the generator and the transmission functions as a torque control device to crank the engine up to starting speed. Once the engine is up to idle speed, the drive functions as a speed control device to provide constant frequency alternating current power from the generator to the aircraft system. In the generating phase, the control system provides for close frequency control and load division to permit multiple unit parallel operation.

The functional arrangement of the various elements is shown in the block diagram of FIG. 1. As illustrated there, engine 10 and generator 11 are interconnected by a transmission unit 12 embodying the principles of the present invention. Unit 12 comprises a housing structure adapted to be bolted onto the engine 10 and adapted to have the generator 11 secured directly thereto. The transmission includes hydraulic units 13 and 14, hydraulically interconnected, and an epicyclic gear train or differential 15. During the generating mode, when the generator is driven by the engine, the engine drives the differential 15 which in turn drives the generator directly and through the hydraulic units 13 and 14. Conversely, during the starting mode the generator drives the engine through the hydraulic units and the differential, as will be explained in more detail hereinafter.

Hydraulic units 13 and 14 may be substantially identical in structure, as will appear. In terms of function, and with reference to the generating mode, the unit 13 may be described as an input unit or a pump unit, and the unit 14 may be described as an output unit or a motor unit, and such terminology may be employed hereinafter for purposes of simplicity, but during transition from the starting mode to the generating mode, the unit 14 may function as a pump unit and the unit 13 may function as a motor unit, as will appear. As illustrated, units 13 and 14 are of the axial piston, swash plate type, and output or motor unit 14 is a variable displacement reversible unit, the swash plate being movable in opposite directions from a neutral center position. Speed and torque control is accomplished by control of displacement of this unit. Unit 13 may be described as a fixed displacement unit since its displacement is not varied for purposes of control during the synchronous starting mode or during the generating mode, but it is a variable displacement unit in that the displacement is variable between a maximum limit and a zero limit, the latter providing for substantially complete reduction of the load on the generator while it is attaining synchronous speed. Flexibility of operation is accomplished by separating the pump and motor hydraulic elements to allow freedom of control of speed and torque between the two elements.

Referring now to FIGS. 2, 3 and 4, the transmission unit includes a housing structure comprising a main casing member 20 of approximate cylindrical configuration initially cast and later machined and a complementary cover member 21 of a generally similar nature. Cover member 21 carries a device 23 secured thereto which may be described as a quick attachment device facilitating quick mounting and dismounting of the unit 12 to an engine such as that illustrated at 10. The device 23 may be considered conventional insofar as the present invention is concerned and need not be described in detail herein. At the opposite end of the transmission unit, housing member 20 carries threaded studs as at 25 for purposes of attaching a generator 11 thereto.

Referring now to FIGS. 5 and 6 also, housing member 21 is provided with a device 26 which may be described as a quick disconnect device including a shaft 27 adapted for suitable connection with the gear box of an engine such as that illustrated at 10. The device 26 is a power transmission device and includes an output shaft 28 for transmitting power to and from the unit 12, as well as suitable means which may be automatically or selectively controlled remotely for purposes of disconnecting the shaft 28 from the shaft 27 to disconnect power to the unit 12 while the engine 10 is driving, in cases of emergency, for example. The device 26 may be considered conventional insofar as the present invention is concerned, and need not be described in detail herein.

Transmission unit 12 includes a gear 30 splined on the shaft 28 for transmitting power between the differential 15 and the shaft 28, such gear functioning as an input gear during the generating mode and an output gear during the starting mode. Unit 12 also includes a hollow internally splined shaft 31 which may be regarded as an output shaft from the unit 12 while operating according to the generating mode and an input shaft while operating according to the starting mode, such shaft being adapted for connection with the generator shaft.

Following the power transmission trains through the transmission unit 12 from the input gear 30 to the output shaft 31, according to the generating mode, and with reference to FIGS. 5 and 6, gear 30 meshes with a gear 33 of differential 15 fixed for rotation with a hollow shaft 34 having an integral gear carrier 35 supporting a pair of rotatably mounted elongate pinions 36 and 37. Gear 36 has gear teeth 36a and 36b. Gear 37 has gear teeth 37a and 37b. Gear teeth 36a and 37b are in mesh, and gears 37a and 36b are in mesh, so that gears 36 and 37 rotate together in opposite directions. Gear teeth 37b also mesh with an internal gear 39 on a hollow sleeve 40 having an external gear 41 in mesh with a gear 43 which may be described as the drive gear for the input or pump unit 13. Gear teeth 36b also mesh with an internal gear 45 on a hollow sleeve 46 having a gear 47 fixed thereon for rotation therewith and meshing with a gear 48 on the transmission unit output shaft 31. Gear 47 also meshes with a gear 49 which may be described as the output gear from the output or motor unit 14.

In operation, during the initial phase of the starting mode, with the generator operating as an induction motor, when the electrical output torque must be kept to a minimum, the hydraulic load is minimized. The hydraulic elements are controlled to zero pressure, thereby placing zero restraining torque on the generator, and providing zero torque to the engine. The torque on the generator during this mode differs from zero only by virtue of the losses in the system. Both of the units 13 and 14 are held at zero displacement. Thus, on rotation of the generator driven shaft 31, rotating the gear 48, gears 47 and 49 are driven. Since both hydraulic units are at zero displacement, there is no drive from the unit 14 to unit 13 and no load is imposed by the gear 43 of the unit 13 on the differential 15. Since there is a substantial engine load on the gear 33, the carrier 35 remains stationary. Rotation of gear 47 causes rotation of internal gear 45, driving the gears 36 and 37 which drive internal gear 39, rotating gear 43 backwardly, ultimately at maximum speed.

When the generator attains about 95% of its synchronous speed, a start cycle is initiated. After an appropriate time delay, which allows the generator to obtain its synchronous speed and switch electrically from an induction motor to a synchronous motor, hydraulic unit 13 is placed at full displacement, and unit 14 follows toward full displacement in a negative direction, under control of means which will be described hereinafter. Unit 13 is thus driven by gears 41 and 43, pumping fluid to motor 14. To apply torque to the engine after the generator is up to synchronous speed, displacement of the unit 14 is reduced, increasing pressure in the hydraulic circuit since unit 14 at reduced displacement tends to handle less of the fluid pumped by unit 13. A load is thereby imposed on the gear 41, retarding rotation of internal gear 39, causing rotation of carrier 35 and applying torque to the engine. Initially, a constant torque may be applied by regulating pressure to a constant value. After the engine reaches light off speed (800–1000 r.p.m., for example), torque may be reduced in inverse proportion to engine speed increase. Output from motor driven gear 49 is put into differential gear 47.

Ultimately, the engine attains a self-sustaining speed (1800–2000 r.p.m., for example), after which the starter is cut out, that is, the generator is disconnected from its source of power, at about 30000 r.p.m. (engine speed), for example. At this time, the engine is capable of some load, but none is applied yet. Upon disconnection of the generator from its electrical source, motor 14 momentarily tends to pump, and pump 13 to motor. Between starter cutout and engine idle speed, 4000–5000 r.p.m., for example, the direction of rotation of gears 43 and 39 is reversed to the forward direction. Now, with the engine rotating the gear carrier 35 in the same direction it was rotating, the pump unit 13 and the differential output gear 47 constitute a load on the differential, and both are driven by the differential, the pump being driven from gear carrier 35, gear 37b, gear 39, and gear 41. The differential output gear 47 is driven from the gear carrier 35 through the gear 36b and the gear 45. Pump unit 13 delivers fluid to the motor unit 14, and since the pump unit is now driven in a forward direction, opposite its initial reverse rotation, the swash plate of the motor unit 14 is moved over center to a positive displacement position (at about the time the rotation of gear 43 and 39 is reversed), thereby driving the gear 49, and the gear 47. At about this time the generator load is applied, and power for driving the generator is transmitted from the engine partially through the hydraulic transmission including hydraulic units 13 and 14, and partially directly through the differential 15, engine speed attaining a maximum of 7000–9000 r.p.m., cruising speed being about 90% of maximum speed.

Certain basic criteria should be satisfied by any satisfactory transmission for the purposes set forth, namely, (a) the generator should be accelerated to its synchronous speed with a minimum load and then have the load applied to start the engine, (b) the engine should be started with a minimum of losses, especially at higher engine speeds where more power is being supplied to the engine, and (c) the unit should have a reasonable efficiency when operating as a constant speed transmission. In other words, it is important to have a unit which is efficient both while operating as a starter drive to start the engine, and while operating as a constant speed transmission for driving the generator.

The particular arrangement of the pump unit 13, the motor unit 14 and the differential 15 is significant in providing an efficient drive to be used for both starting the engine and driving the generator. Considering for the moment three possible arrangements, (1) the first involving a transmission utilizing only a pump unit as at 13 and a motor unit as at 14, with the engine connected directly with the pump unit and the generator connected directly with the motor unit, (2) the second involving a pump unit as at 13, a motor unit as at 14, and a differential as indicated in broken lines at 15' in FIG. 1, and (3) the third arrangement that as illustrated in full lines in FIG. 1.

The first arrangement referred to in the paragraph immediately preceding allows for unloading the generator if the hydraulic unit adjacent the generator is variable so that it can be placed at zero displacement during the acceleration of the generator, and such a system does have low losses during the start. However, the losses increase with increasing engine speed and increasing flow, and the system is not highly efficient when operating as a constant speed drive since all the power is transmitted through the hydraulic units.

The two differential systems referred to above as second and third are essentially equal in performance while operating as a constant speed transmission, but the third is preferable over the second as a starting system. More particularly, in the second unit referred to above, with the differential located as at 15', during the starting mode the generator can be accelerated to synchronous speed by either short circuiting the hydraulic lines between the hydraulic units or by varying the displacement of the unit 14 to zero. Then, torque can be supplied to the engine by throttling the short circuit in the former case, or by increasing displacement of the unit 14 in the latter case. The short circuiting and throttling method allows for both hydraulic units to be at full displacement, and therefore for both units to apply maximum torque to the engine, but the method dissipates power in the form of heat in the hydraulic fluid. By varying the displacement of the unit 14, there is no similar dissipation of power, but because the unit 14 is initially at zero or low displacement, only the unit 13 applies maximum torque to the engine. This means that for the same engine torque requirement the unit 13 must have a larger displacement capacity and displacement controls would be required for both hydraulic units, a control for unit 14 during the starting mode and a control for unit 13 during the generating mode.

If the differential is located as shown in full lines at 15, both hydraulic units turn while the generator is being accelerated to its synchronous speed, after which both hydraulic units are placed at full displacement. Torque is then applied to the engine by reducing the displacement of the unit 14. The engine torque is proportional to the unit 13 torque, but because the unit 13 can be run at its maximum speed in both directions, the speed ratio between the unit 13 and the engine can be twice that of the unit 13 if the differential is located as at 15'. Therefore, the torque can be equal to that required of unit 13 with the differential located at 15' and employing the dissipative short circuiting and throttling method but without having the drawback of wasting energy because energy taken by gear 43 is returned by gear 49, less losses. In a system such as that shown in full lines in FIG. 1, it is only necessary to have one variable hydraulic unit since the unit 14 is the one varied during the generating mode of operation also. Actually, the unit 13 is also variable but not for purposes of torque control or speed control, but only for placing the unit at zero displacement during acceleration of the generator to synchronous speed so that there will be no flow in the hydraulic circuit and therefore less load on the generator.

Referring particularly to FIGS. 5 and 10, it will be seen that the hydraulic units 13 and 14 are substantially identical in construction as regards the fluid handling portions thereof. Accordingly, similar reference numbers will be utilized in describing the components thereof. Each unit includes a rotatable cylinder block 60 having an annular series of axially disposed cylinders 61 receiving reciprocable pistons 62 suitably urged outwardly of the block. The pistons have spherical ends 63 engaged with bearing shoes 64 seated on a face member 65 rotatably mounted on swash plate 66. Cylinder block associated with the unit 13 is splined on a shaft 68 carrying gear 43, and cylinder block 60 associated with the unit 14 is splined on a shaft 69 carrying gear 49. Coiled compression springs 73 respectively surrounding the shafts 68 and 69 bear at one end against the shaft spline and at the opposite end against a bearing collar 74 retained in the cylinder block bore by a snap-ring, so that the cylinder blocks are urged respectively against port plates 76 abutting the housing member 21 which is suitably formed to provide inlet and outlet fluid connections to the port plates.

Swash plates 66 each carry bearings as at 80 at opposite sides thereof respectively mounted on trunnions 81 provided in the housing member 20 so that the swash plates are each pivotable about the axis of the mounting trunnions. In the unit 13, the position of the swash plate is controlled by a piston and cylinder device 83 and in the unit 14 the position of the swash plate is controlled by a piston and cylinder device 84. The devices 83 and 84 are controlled by means to be described hereinafter.

As illustrated in FIG. 8, cylinders 61 are ported adjacent the port plates 76, as shown at 93, so that as the cylinder blocks rotate, the cylinders communicate successively with inlet and outlet ports provided in the port plates and in the housing member 21. As seen best in FIG. 9, the housing member 21 is provided with arcuately shaped inlet and outlet ports 96 and 97 associated with the unit 13 and similarly shaped ports 98 and 99 associated with the unit 14. Similarly shaped ports in the port plates 76, coincident with those at 96, 97, 98 and 99, provide communication between the cylinder block and the housing member 21. Ports 96 and 98 are constantly in communication by virtue of a connecting passage 101 in the housing 21, and ports 97 and 99 are similarly communicating by virtue of a passage 102. Thus, the hydraulic units 13 and 14 are hydraulically interconnected in a substantially closed circiut.

As best seen in FIGS. 5 and 10, drive shaft 69 of the hydraulic unit 14 is suitably connected with a coaxial drive shaft 105 for driving auxiliary pumps 106 and 107 which may be of a conventional gear type, for example, the former a scavenge pump for picking up leakage fluid and the like from a sump in the bottom of the housing 20, 21 and delivering such fluid to a filter and cooler outside of the transmission unit, and the latter a charge pump for drawing makeup and cooling fluid from a reservoir in the housing 20, 21 to replenish the system, fluid being supplied to such reservoir from the filter and cooler outside the transmission unit. The auxiliary pumps will be described in more detail hereinafter in connection with the hydraulic circuit diagram.

As will appear in describing the circuit diagram hereinafter, two rotary governors are utilized in connection with the controls imposed on the circuit, and such governors also appear in FIG. 8. These include a basic governor 110 and a limit governor 111. The two are connected to a common drive gear 112 meshing with a worm 113 on a shaft 114. As illustrated in FIGS. 5 and 6, the shaft 114 carries a gear 115 meshing with the gear 48 on the unit output shaft 31, so that the governors are driven whenever the shaft 31 is driven.

For purposes that will appear, a start pump 120 (FIGS. 5 and 6) is provided coaxially with the engine connected shaft 28 to be driven thereby, and this may be of a conventional gear type.

CIRCUIT DIAGRAM

Referring now to the diagrammatic showing in FIG. 13, where parts corresponding to those previously described are designated by similar reference numbers, it will be understood that the hydraulic units 13 and 14 are interconnected in a closed circuit by virtue of passages 101 and 102 (FIG. 9) so that fluid may flow from one unit to the other and back.

As will appear, in operation a significant amount of fluid moving between the hydraulic units 13 and 14 is constantly withdrawn and replaced by cooling fluid. Such cooling fluid is supplied to the system by delivery into the low pressure line of the conduits 101 and 102 through an intake check valve means 130 also illustrated in FIG. 9 and including a passage as at 131 having opposite ends connected respectively to the lines 101 and 102. Such opposite ends are provided respectively with check valve members 132 normally spring biased toward each other, away from the conduits 101 and 102, to seated positions blocking communication of the passage 131 with lines 101 and 102. Intermediate opposite ends of the passage 131, a conduit 134 communicates therewith and leads thereto from the charge pump 107 which supplies makeup and cooling fluid. When the system is in operation, fluid pressure in the high pressure line of the conduits 101 and 102 will maintain the adjacent check valve 132 seated while low pressure in the other line will permit the adjacent valve 132 to open under the urge of fluid supplied by the charge pump.

Charge pump 107 draws fluid from a suitable reservoir means 137 provided in the transmission housing through a passage 138 and through an anti-drain valve or inlet valve means 140 (see FIG. 12 also) including a spring biased valve plunger 141 normally spring-urged to a position blocking communication between the reservoir and the charge pump but movable to an open position as illustrated for supplying the charge pump. Fluid is supplied to the reservoir 137 in the transmission housing through a conduit means 143 which extends outside the housing and connects with a filter and cooler 144 which supplies the reservoir with filtered and cooled fluid previously withdrawn from the system in a heated condition. Leakage fluid from the valve means 140 is returned to the filter and cooler 144 through a passage 145.

Heated fluid is withdrawn from the system through a shuttle valve means 146 also illustrated in FIG. 9 and including a passage 147 having opposite ends communicating respectively with the lines 101 and 102. The passage 147 receives a valve plunger 148 having valving portions 149 respectively at opposite ends thereof for controlling communication of the low pressure line of the conduits 101 and 102 with a withdrawal passage 150 intersecting an intermediate portion of the passage 147. In operation, fluid pressure in the high pressure line of the conduits 101 and 102 moves the valve plunger 148 to a position in which the adjacent valving portion 149 is seated, blocking communication between the high pressure line and the withdrawal conduit 150. At the same time, the valving portion 149 adjacent the low pressure line is moved to a position placing the low pressure line in communication with the withdrawal conduit 150.

Heated fluid withdrawn through the passage 150 is discharged over a charge relief valve means 155 (see FIG. 8 also) for maintaining suitable charge pressure and including a valve plunger 156 normally urged to a valve closed position as illustrated in FIG. 13 but movable toward the right as illustrated, upon the application of fluid pressure from the passage 150 to the left end of the valve member, to a position placing the passage 150 in communication with a passage 157 through a reduced outer portion 158 on the valve member 156. Leakage fluid from the valve means 155 is discharged to a collection sump in the bottom of the transmission housing through a passage as at 159.

If desired, the passage 157 leading from the charge relief valve may connect with an eductor 163 (see also FIG. 10) located in the collection sump and having intake ports 164 so that fluid passing over the charge relief valve picks up fluid from the sump through a venturi action, such fluid being drawn through a passage 164 by the scavenge pump 106 which delivers the fluid to a conduit means 165 partly in the transmission housing and extending exteriorly of the housing to the filter and cooler 144.

Start pump 120 is supplied from the reservoir 137 through valve means 140 and a conduit 166, and delivers through a conduit 167.

The circuit also includes an overpressure valve means 170 (see FIG. 6) controlling the piston and cylinder device 84 associated with the hydraulic unit 14 for varying the displacement thereof. The valve means 170 is utilized to drain fluid from the piston and cylinder device 84 for purposes of permitting spring movement of the displacement varying means toward the left as viewed in FIG. 13 from a rightmost position to the right of that illustrated in FIG. 13 to the neutral center position illustrated in FIG. 13 and from the neutral center position illustrated in FIG. 13 to a leftmost position on the left of that illustrated in FIG. 15. For these purposes, the valve means communicates with the piston and cylinder device through a passage 171 and a branch passage 172. For purposes of control, the valve means senses pressure in the conduit 102 through a passage 173.

The valve means includes a movable valve plunger 175 normally urged by spring means 176 to the position illustrated in FIG. 13, blocking communication between the passage 172 and a drain port 177. The upper end of valve plunger 175 is exposed to pressure in the passage 173, and the valve has two pressure settings, that is, the valve is intended to respond to two different pressure values, at different times, to drain the piston and cylinder device 84. More particularly, when spring means 176 and its seat 179 are positioned as illustrated in FIG. 13, the valve is set to respond to a pressure of approximately 500 p.s.i. and under such conditions moves to a position placing the passage 172 in communication with drain port 177 through a reduced valve stem portion 180. As will be explained in more detail hereinafter, at another stage in the operation, fluid under pressure is ported to the lower end of spring seat 179 through a passage 182, raising the seat to a position not illustrated wherein the spring means is compressed to a value such that the valve is responsive to pressure in the line 102 on the order of 6,000 p.s.i. Leakage fluid from the valve means 170 is conducted through ports 183 and 184 to the collection sump.

The circuit also includes a reverse torque valve means 190 similar in some respects to the valve means 170, and also illustrated in FIG. 11. Valve means 190 controls the flow of control fluid to the piston and cylinder device 84 controlling displacement of the hydraulic unit 14. For this purpose, control fluid is delivered from the conduit 134 through a passage 191 to the valve means 190 and passes from the valve means 190 to the piston and cylinder device 84 through the conduit 171. A slidable valve plunger 193 is normally biased by spring means 194 to the position illustrated in FIG. 13, blocking communication between the passages 191 and 171. The plunger 193 is subjected to pressure in the line 101 through a conduit 195, and upon the existence of sufficient pressure in conduit 101, valve member 193 may be moved to a position connecting passage 191 and 171 through a reduced stem portion 197 on the valve plunger.

When the spring means 194 is positioned as illustrated in FIG. 13, the reverse torque valve means 190 is set to control pressure in the conduit 101 to approximately 500 p.s.i. Upon the admission of fluid to the valve means 190 as through a conduit 199 to a position behind spring seat 200, the seat is movable to a position compressing the spring means, such that the valve is set for 6,000 p.s.i. In addition to the two settings mentioned immediately above which correspond to the settings of the overpressure valve means 170, a third setting is provided by means of a hollow piston 202 on which spring seat 200 normally rests. Upon the admission of fluid behind the piston 202 as through a passage 204, the piston and spring means are movable to a limit represented at 205 compressing the spring means to an intermediate position providing a pressure setting of about 2,000 p.s.i. Leakage fluid from the valve means 190 is drained to the collection sump through drainage ports 207 and 208.

The overpressure valve means 170 and the reverse torque valve means 190 may both be regarded as pressure-limiting valve means operable by correcting the control signal to the displacement varying device 84 of the unit 14 until such time as the pressure in the high pressure line of the conduits 101 and 102 is reduced to the valve setting at that particular time. The 500 p.s.i. setting of both valve means is utilized to prevent excessive loads being imposed on the generator during the induction phase of the starting mode. The 6,000 p.s.i. setting of the overpressure valve is utilized to limit the working pressure when the engine is driving the generator. The 6,000 p.s.i. setting of the reverse torque valve limits working pressure when the generator is cranking the engine. The 2,000 p.s.i. setting of the reverse torque valve is utilized under some circumstances to crank the engine at a reduced torque without starting it, as for example, for checkup, or to purge the engine after an unsuccessful start attempt and before a new attempt.

The circuit also includes a pressure-responsive switch 210 and a pressure-responsive switch 211. Pressure switch 210 is responsive to control fluid delivered by the limit governor 111 through a conduit 213 to signal to the generator control panel (not shown) that the generator has attained its synchronous speed, completing the induction phase of operation, to convert the generator to a synchronous machine. Switch 210 thus supplies a signal indicating that the generator is either below its normal speed range or in its normal speed range, and as will appear, may also signal an overspeed condition. Pressure switch 211, as will appear, is responsive to fluid pressure in a conduit 214 and operates to supply an electrical signal to the generator control panel (not shown) to indicate when the input speed is above or below the starter cutoff speed during the starting mode and during shutdown.

Basic governor device 110 (also illustrated generally in FIG. 8), which receives control fluid from charge pump 107 through a conduit 215 and a branch passage 216 for delivery through a conduit 217, may comprise an apparatus of the general type shown in U.S. Letters Patent 2,890,877 to Straznickas. The device includes a valve plunger 220 normally urged to the position shown in FIG. 13 by spring means 221, placing passages 216 and 217 in communication through a reduced stem portion 22. A rotary body driven by gear 112 carries a pair of flyweights 223 pivotally mounted thereon and adapted upon attainment of suitable rotary speed about the axis of plunger 220 to move outwardly, thereby to pivot extensions as at 224 in a direction to move the valve plunger against the force of spring 221 to a position blocking communication between passages 216 and 217, and placing the passage 217 in communication with drain port 225. Preferably a magnetic trim device represented by the coil 227 is utilized, in turn controllable by an electrical speed indicative signal not shown, superimposing a magnetic control on the flyweights 223 for purposes of very precise frequency control or load sharing between paralleled units.

Limit governor device 111, also seen in general in FIG. 8, receives control fluid from the charge pump 107 through conduit 215, and may be of a general type illustrated in U.S. Letters Patent 2,885,566 to Sadler et al., but the device 111 includes an overspeed control superimposed on the otherwise conventional structure. As illustrated, device 111 includes a valve plunger 230 normally urged toward the right as viewed in FIG. 13 by a pair of separate spring means 231 and 232, the former acting against the left end of plunger 230 and against a spring seat 233 movable between limit positions represented respectively by abutment means 234 and 235, and the spring means 232 acting against seat 233 and against a plunger 237 normally positioned as illustrated in FIG. 13.

In its rightmost position, valve plunger 230 places passage 215 out of communication with a passage 239, by virtue of land 240 and places passage 215 in communication with passage 213. In the position illustrated in FIG. 13, the valve plunger isolates passage 215 by virtue of lands 240 and 241, and places passage 213 in communication with a drain port 243 through a reduced stem portion 245 and places passage 239 in communication with the drain port 243 through an internal passage 246. Valve member 230 is movable toward the left from the position illustrated in FIG. 13 to a position wherein passage 239 is connected to drain port 243 through internal passage 246 and reduced portion 245, and passages 215 and 213 are placed in communication through a reduced stem portion 248. The valve member 230 is also movable further toward the left from the position just described upon movement of the spring seat 233 against abutment 235 to a position where passages 215, 213 and 239 are all connected to drain port 243. The rightmost position described occurs when the governor is at rest. The position illustrated in FIG. 13 occurs during the induction phase of the starting mode, the first described leftward position occurs during operation at normal speeds, and the leftmost position occurs in the event of an overspeed condition sufficient to move seat 233 against abutment 235 against the force of spring 232.

The governor includes a rotary body driven by gear 112 and carrying pivotally mounted flyweights 250 having extensions as at 251 to shift the valve member as the body rotates about the axis of the valve member.

Plunger 237 is exposed to a conduit 254 through which pressure fluid is supplied to move the plunger 237 toward the right and thus increase the overspeed setting of the governor, as will be explained in more detail hereinafter.

The circuit also includes a program and follower valve means 260 including a follower valve 261 and a program valve 262, illustrated in their physical environment in FIG. 11.

Follower valve 261 includes a valve plunger 264 having a hollow interior receiving a coiled compression spring 265 seated in the plunger and bearing against a spring seat 266 slidable in the plunger and engaged by a stem 267 pivoted on a link 268 in turn pivotally mounted on a stationary support 269. Link 268 abuts a valve plunger 271 in the program valve 262. Valve plunger 264 abuts a cam 273a carried on a pivotal arm 273b having a follower 273c engaging a cam 274 on swash plate 66 of the hydraulic unit 14. Thus, the spring 265 urges the plunger 264 against the cam 273a and urges the link 268 against valve plunger 271. Cam 274 has concentric low portion 274a for holding plunger 264 in the position shown, a concentric high portion 274b, and a connecting portion 274c for controlling torque delivered to the engine during starting as explained in more detail hereinafter. The cam 274, follower 273c, cam 273a, plunger 264, spring 265 and linkage 268 comprise a predetermined torque program for determining the torque delivered to the engine during starting.

When the plunger 264 is positioned as illustrated in FIG. 13, an external groove 275 thereon places passages 213 and 214 in communication with each other and with passage 182 leading to the overpressure valve 170. At the same time, a passage 277 and a passage 278 communicates with a drain port 281 through the interior of the valve bore across the end of the valve member 264. Movement of the valve member 264 toward the left disposes the annular groove 275 to place the passage 213 in communication with passage 277 and with passage 278. At the same time, passages 214 and 182 communicate with a drain port 279 through external longitudinal grooves 280 on the valve member 264. The interior of the valve member 264 communicates with drain port 279 through radial ports 283. The first position of the valve member 264 described immediately above occurs when the swash plate associated with the hydraulic unit 14 is positioned as illustrated in FIG. 13, and the second valve position occurs when the swash plate is pivoted to the right from the position of FIG. 13. When the swash plates move overcenter to the left, the valve member 264 is prevented from following swash plate beyond the position of FIG. 13 by concentric cam low portion 274a.

When the valve plunger 271 in the program valve 262 is positioned as illustrated in FIG. 13, it blocks communication between passages 291 and 292, and places the latter in communication with a drain port 293. It will be understood that the valve member 271 is urged to the position illustrated in FIG. 13 by means of the spring 265 in the follower valve 261 through the medium of the pin 267 and the link 268. The left end of valve plunger 271 is exposed to fluid in a passage 294 and movable toward the right from the position illustrated in FIG. 13 by fluid pressure in passage 294 to a position placing conduits 291 and 292 in communication through a reduced stem portion 295 on the valve member. Leakage fluid is drained from valve 262 through a drain port 297. The spring pressure controlling valve 262 is adjustable by adjusting the stationary support 269, as by turning its screw threaded support 270, thereby to accommodate the system to various engines.

A bias valve 300 includes a valve plunger 301 urged toward the left to the position illustrated in FIG. 13 by a spring 302 in which position a land on the valve member blocks communication between the passage 254 and a passage 304 communicating with passage 134. At the same time, passage 254 is connected to drain port 305. The left end of valve member 301 is exposed to fluid pressure in the passage 307 and movable by such pressure toward the right to the position illustrated in FIG. 14 where a reduced stem portion 308 places passages 254 and 304 in communication with each other. Leakage fluid passes through a drain port 309. Bias valve 300 is illustrated in its physical environment in FIG. 7.

A trip valve 310, also visible in FIG. 11, includes a valve plunger 312 normally urged toward the right to the position illustrated in FIG. 13 by a spring 313, in which position passage 217 communicates with a passage 315 through a reduced valve stem portion 316, and wherein communication between passages 292 and 315 is blocked by a valve land 318. Valve stem 316 is movable toward the left from the position illustrated in FIG. 13 to a position wherein communication between the passages 217 and 315 is blocked by land 318, and communication is established between passages 292 and 315 through reduced valve stem portion 320. Leakage fluid is drained from the valve through a port 322.

A motoring solenoid valve 330, also shown in FIG. 11, includes a valve plunger 331 normally positioned as illustrated in which position passage 199 and a passage 332 communicate through a reduced stem portion 334 and wherein passage 204 communicates with a drain port 335 through the upper reduced stem portion. Communication is blocked between passages 204 and 332 by a land 336. The valve stem 331 is movable upwardly from the position illustrated upon energization of a solenoid 337 to a position wherein the reduced stem portion 334 places passages 204 and 332 in communication, wherein communication between passages 199 and 332 is blocked by a land 338 and communication is established between the passage 199 and a drain port 339. The valve 330 is utilized to establish the 2,000 p.s.i. setting of valve 190.

A sequence valve 340 (see FIG. 11 also) includes a valve plunger 341 normally positioned as illustrated in FIG. 13 by a spring 343 so that a passage 345 leading to piston and cylinder device 83 is placed in communication with a passage 346 through a reduced stem portion 347, and passage 278 is placed in communication with passage 332 through an internal stem passage 350. Valve stem 341 is movable upwardly from the position illustrated in FIG. 13, by means of fluid delivered through passage 167 from start pump 120, to a position wherein passage 167 communicates with passage 345, passage 332 and spring chamber 352 communicate with a drain port 353 through internal stem passage 350, and passage 346 is isolated.

OPERATION

In operation, prior to the initiation of an electric starting cycle, all of the various valve means will be forced to the normal positions illustrated in FIG. 13 and the hydraulic unit 13 will be at zero displacement. Upon initiation of the start cycle, the generator will begin to turn the charge pump 107, the scavenge pump 106 and the governors 110 and 111. As soon as the circuit is charged with oil from the charge pump 107, if there is any error in the position of the swash plate associated with the hydraulic unit 14, that is, if the swash plate is inclined from the normal neutral center position, a pressure will be established in one of the main hydraulic lines 101 and 102. Pressure thus established will be sensed either by the reverse torque valve 190 or the overpressure valve 170, depending upon which of the lines 101 and 102 is pressurized, reverse torque valve 190 sensing pressure in line 101, and overpressure valve 170 sensing pressure in line 102, and the swash plate of the unit 14 immediately positioned at zero displacement. If pressure is sensed in line 101, reverse torque valve member 193 will be positioned to admit fluid from passage 191 to passage 171 and thence to the piston and cylinder device 84, placing the unit 14 at zero displacement. If pressure is sensed in line 102, overpressure valve member 175 will be moved to a position placing drain port 177 in communication with passages 172 and 171, draining fluid from the piston and cylinder device 84 to establish zero displacement. Pressure in the main hydraulic circuit is thus maintained at a minimum value. Since the hydraulic units 13 and 14 are at zero displacement and the pressure across the units therefore at a minimum value, the load imposed upon the generator will be at a minimum while it is accelerating during the induction phase of the starting mode to attain its synchronous speed. During the induction phase, the hydraulic unit 14 will not be driven by the unit 13, and the torque delivered by the generator to the differential 15 is transmitted to gear 49 of the hydraulic unit 14 and gear 43 of the hydraulic unit 13 to rotate the latter reversely. The engine will not be driven at this time.

When the generator attains about 95% of its synchronous speed, flyweights 250 in the limit governor 111 trip the governor (a snap action) to the position described wherein valve member 230 places passages 213 and 215 in communication through reduced stem portion 248, and places passage 239 in communication with drain port 243 through internal stem passage 246. Fluid from the charge pump 107 is thus ported through the passage 215, the limit governor valve, and the passage 213 to the pressure switch 210. Actuation of the pressure switch 210 provides a signal to a generator control panel (not shown) indicating that the induction phase of operation is completed for purposes of converting the generator to a synchronous machine. Actuation of pressure switch 211 has no effect at this time.

When the generator attains its synchronous speed, the basic governor 110 under the influence of its flyweights 223 has its valve member 220 moved to the position described wherein communication between the passage 216 and either the passage 217 or the drain 225 is controllable by the righthand valve land on plunger 220, but as will appear, the governor is soon isolated by trip valve 310.

Actuation of limit governor 111 as described above also ports fluid from the charge pump through passage 215, passage 213 and branching passage 346 to the sequence valve 340, through the reduced stem portion 347 thereof and the passage 345 to the piston and cylinder device controlling displacement of the hydraulic unit 13, moving the unit into full displacement position where it is held by charge pressure in a passage 370, regardless of the sequence valve. As the hydraulic unit 13 goes into full displacement, pressure is established in the line 101 and such pressure is transmitted through passage 195 to the reverse torque valve 190, actuating the latter to port fluid from passage 191 through reduced valve stem portion 197 to passage 171 and the piston and cylinder device 84 of the hydraulic unit 14, so that the latter moves toward a full displacement position in a negative direction, toward the right as illustrated in FIG. 13.

As the unit 14 moves toward full displacement, the follower valve stem 264 moves toward a position such that control fluid is ported through the reduced sleeve portion 275 from the passage 213 to the passage 277 and thence to the trip valve 310. The trip valve member 312 is moved to the position described where valve land 318 blocks communication between the passages 217 and 315, isolating the basic governor so that any signal that might have been provided therefrom to the piston and cylinder device 84 may not be utilized. At the same time, passage 315 is placed in communication with passage 292 through the reduced stem portion 320 so that control signals to the piston and cylinder device 84 will now come from the program valve 262 through the passages 291, 292, 320, 315 and 171.

The movement of the follower valve member 264 as described above also places the passage 213 in communication with passage 278 through the reduced sleeve portion 275 supplying control fluid through the passage 278, the sequence valve internal stem passage 350, the passage 332, the motoring solenoid valve reduced stem portion 334 and the passage 199, to the reverse torque valve spring seat 200, moving the latter to the position establishing the high pressure setting on the reverse torque valve.

During this stage of operation, pressure in the passage 195 and in the passage 307 acts against the left end of the bias valve plunger 301, moving the latter toward the right to the position described wherein the reduced stem portion 308 places passages 304 and 254 in communication, so that fluid from the former passage is delivered to the latter, acting upon the limit governor piston 237, compressing the spring 232 so that the overspeed setting of the limit governor 111 is at the higher of the two possible values during the synchronous phase of the starting mode, to allow for any inaccuracy in the ramp power supply to the generator.

With the program valve 262 controlling the displacement of the hydraulic unit 14 during the synchronous phase of the starting mode, the program valve senses the pressure of fluid in the passages 195 and 294, communicating with the high pressure line 101, and compares such pressure to the spring force exerted by follower valve spring 265, the latter being controlled by the angle of the swash plate in the hydraulic unit 14, the strength of the spring 265 being chosen to control the starting torque delivered to the engine to some value which will provide an acceptable starting torque without overloading the generator.

The graph of FIG. 14 illustrates diagrammatically the operation of the system during startup. In that figure it will be noted that the speed of the variable unit 14 remains constant throughout the operation, this by virtue of the connection of its output gear 49 to the differential gear 47 which is in turn in mesh with gear 48 on the generator connectible shaft which is driven at a constant speed during starting while the generator acts as a synchronous motor and at a constant speed during generating by virtue of the constant speed drive of this system. The displacement of unit 14 initially is at a maximum position in one direction and is varied toward neutral, through neutral and ultimately to a maximum position in the opposite direction during the generating mode. Displacement of the "fixed" unit 13 remains constant in a maximum position throughout the operation, while its speed varies from maximum in one direction to maximum in the opposite direction during generating. The direction of rotation of unit 13 is reversed at about the time the angle of swash plate 66 in unit 14 is reversed. Hydraulic unit 13 functions as a pump and hydraulic unit 14 functions as a motor throughout the operation except for a transitory stage after starter cutout and before generating when the operations are momentarily reversed. The torque curve illustrates that substantially constant torque is delivered to the engine during starting until the engine reaches liftoff speed whereupon the torque is reduced to starter cutout speed at which time it is discontinued. The pressure curve during starting is almost identical to the torque curve.

In operation, at the beginning of the synchronous phase of the starting mode, with both hydraulic units 13 and 14 at or near maximum stroke, the hydraulic system constitutes a load on the differential at the gear 41 which drives the pump 13. The load thus applied on the gear 41 in the differential results in rotation of the differential gear 33, applying torque to the engine. With the swash plate 66 of hydraulic unit 14 near maximum displacement angle, the concentric high portion 274b of the swash plate cam positions the follower valve plunger 264 to compress the follower valve spring 265 to its maximum value. The system controls endeavor to maintain a constant pressure so long as the force of spring 265 remains constant. Specifically, program valve member 271 senses pressure in the passages 195 and 294, which communicate with the main line 101, at this time the high pressure line. In the event of a pressure in excess of the setting of spring 265, valve member 271 will be moved toward the right, admitting control fluid through passages 304 and 291, reduced stem portion 295, passage 292, reduced stem portion 320 and passages 315 and 171 to the control piston and cylinder device 84, tending to increase the displacement of unit 14 to handle more fluid and thereby decrease the pressure in the system.

In the event of a pressure in line 101 beneath the setting of spring 265, valve member 271 moves toward the left to port the control piston and cylinder device 84 to drain port 293, tending to reduce the displacement of unit 14 to handle less fluid and increase the pressure in the system. In this manner, constant pressure is maintained and constant torque delivered to the engine for a predetermined time.

It will be understood that as torque is delivered to differential gear 33 and to the engine, the engine speed increases and the speed of differential gear 41 reduces, thereby reducing the speed of the pump 13 and reducing the volume of fluid delivered thereby. This tends to result in a drop in pressure in the line 101 which will result in a reduction in the swash plate angle of the motor 14 so the latter will handle less fluid and maintain constant pressure. Initial movement of the swash plate 66 in the motor 14 in this fashion is accompanied by angular movement of the swash plate cam 274, and during such initial movement the concentric high cam portion 274b engages follower 273c without pivoting the arm 273, thereby maintaining constant spring pressure in the follower valve in order to maintain constant system pressure and constant torque to the engine.

After a predetermined time, at about the time the engine reaches liftoff speed, swash plate 66 in the motor 14 will have reached a position where the cam portion 274c provides for a controlled reduction of spring pressure in the follower valve and a consequent reduction in system pressure together with a reduction in torque delivered to the engine. At this time the system functions as a constant horsepower system, and with the reduced torque delivered to the engine as dictated by the predetermined torque program, the engine speed varies inversely. Specifically, with reducing spring pressure in the follower valve, pressure in the line 101 tends to exceed the spring pressure which might result in an increase in displacement of the unit 14 but for the continuously decreasing speed of the pump 13 by virtue of the increasing engine speed. The net effect approximates a reduction in the rate at which the displacement of unit 14 is decreased and therefore a reduction in the torque applied to the engine.

As the starting cycle is of short duration, it can be treated as an overload condition on the electrical and hydraulic elements, thus affording an economy in sizing and weight. During the initial portion of the starting cycle, the hydraulic working pressure is approximately equal to the overload pressure in the system during the generating mode.

When the engine reaches a speed at which it is self-sustaining and assistance is no longer required, the follower valve plunger 264 will have returned substantially to the position of FIG. 13 following the swash plate 66 of unit 14, wherein it will port the input to the trip valve 310 to drain through passage 277, the bore of the follower valve 261 and the drain port 281. Trip valve member 312 thereupon returns to the position illustrated in FIG. 13, isolating the program valve 262 from the system, and the basic governor 110 is again communicated wth control passage 171 through passage 315, the trip valve stem portion 316 and the passage 217 so that the basic governor now controls the position of the swash plate in the hydraulic unit 14.

Return of the follower valve member 264 to the position of FIG. 13 also ports the spring seat 200 of the reverse torque valve to drain through the passage 199, the solenoid valve 330, the passage 332, the spring chamber 352 of the sequence valve 340, internal stem passage 350, passage 278, and drain port 281 at the left end of the follower valve 261. This returns the reverse torque valve 190 to its low pressure setting.

At the same time, the spring chamber 352 of the sequence valve 340 is drained through the same path, allowing pressure from the start pump 120 through passage 167 to move the sequence valve member 341 upwardly where it remains, effectively latched, until the engine is shut down and charge pressure is lost. Movement of the sequence valve member 341 as described ports fluid from the passage 167 to the passage 345 and to the piston and cylinder device 83 of the hydraulic unit 13, holding this unit at the full displacement position illustrated.

It should be noted that start pump 120 adapts the system for engine starting from an independent source whereby the engine, and hence pump 120, might be driven before charge pump 107 is started. Start pump 120 could then properly actuate sequence valve 340, supplying fluid to the system through passage 167, the base of the sequence valve, passage 345, control device 83, and passage 370.

With the follower valve member 264 positioned as illustrated in FIG. 13, fluid is ported from the passage 213, through the follower valve, to the passage 182 and to the spring seat 179 in the overpressure valve 170, moving it to the high pressure setting.

With the follower valve member 264 positioned as described, fluid is also ported from the passage 213 through the reduced sleeve portion 275 to the passage 214 and to the pressure switch 211 which sends an electrical signal to the generator control panel (not shown) to indicate that the start cycle is complete and the generator controls should be changed from starting to generating mode.

About this time, the engine speed reaches a value which leads to a reversal in the direction of rotation of the pump drive gear 43, thereby driving the pump in the opposite direction and resulting in a reduction of the pressure in the line 101 and a build-up of pressure in the line 102. At about the same time, in order to maintain continued rotation of the motor output shaft and gear 49 in the same direction, the swash plate 66 of the unit 14 moves overcenter toward maximum displacement in the opposite direction, the control device 84 being ported to drain at this time, upon build-up of pressure in line 102, acting through passage 173 on valve member 175, porting device 84 to drain through passages 171, 180 and drain port 177.

Upon reduction of pressure in the line 101 as pressure increases in main line 102, the reduced pressure in passages 195 and 307 allows return of the bias valve member 301 to the position illustrated in FIG. 13. The last mentioned valve movement ports the passage 254 to drain through port 305, allowing return of the spring plunger 237 in the limit governor 111 to the position illustrated in FIG. 13 so that the limit governor now is set up to respond to the lower (normal) overspeed setting.

During the generating mode of operaiton, all of the valves are normally in the positions comparable to those at the completion of the start cycle.

During this mode of operation, if there is a transient load or speed variation the basic governor, controlling the hydraulic unit 14, will move to either supply or drain the piston and cylinder device 84 associated with unit 14 in order to maintain a constant output speed regardless of variations in engine speed and regardless of variations in generator load. More particularly, the right-hand valve land on the basic governor valve member 220 is positioned to control the connection of passage 217 to either the supply of charge fluid in passage 216 or the drain port 225. It will be recalled that passage 217 communicates with the piston and cylinder device 84 through the trip valve reduced stem portion 316, passage 315 and passage 171. Thus, if the speed of the basic governor increases above a desired normal speed, flyweights 223 move outwardly, moving valve member 220 to the left and placing passage 217 in communication with drain port 225. This reduces the pressure in the piston and cylinder device 84 so that the spring means therein tends to increase the swash plate angle, reducing the output speed of unit 14. Conversely, if the engine speed reduces, flyweights 223 move inwardly, allowing valve movement toward the right, placing passage 216 in communication with piston and cylinder device 84 to reduce the swash plate angle increasing the output speed of the unit 14. An increase in generator load causes a reaction corresponding to the condition of reduced engine speed described above and a reduced generator load causes a reaction corresponding to an increase in engine speed as described above.

If the output speed of the generator exceeds normal speed as a result of the generator being motored by a unit having its generator in parallel with that illustrated, the torque will attempt to reverse; that is, pressure in the main line 102 will reduce and pressure in the line 101 will increase. The latter pressure increase will be sensed by the reverse torque valve 190 through the passage 195, moving the reverse torque valve plunger 193 to port charge fluid from the passage 191 to the passage 171 and the piston and cylinder device 84 through the reduced stem passage 197, at a rate at least equal to the drain rate established by basic governor 110 due to the overspeed. Fluid thus supplied to the piston and cylinder device 84 reduces the swash plate angle, increasing the speed and allowing the unit to match the speed of the other units referred to without creating an excessive load on the electrical system. The same increase in pressure in line 101 will actuate the bias valve member 301 to a position where it will port fluid from the line 304 to the passage 254 and the spring seat 237, moving the latter to establish the higher value of the overspeed setting in the limit governor 111. The overspeed setting will thus be higher than that on the unit causing the overspeed, in order that this, the better of two generating units, will not be tripped off, thus allowing the bad unit to be tripped off by its governor.

If a load is placed on the system tending to establish a relatively permanent excessive working pressure, such pressure in the line 102 is transmitted through the passage 173 to the overpressure valve member 175, moving the latter to a position porting the passages 172 and 171 and the piston and cylinder device 84 to drain port 177 through reduced stem passage 180, increasing the swash plate angle, increasing the torque and reducing the speed. This condition exists until the pressure is reduced to the value of the valve setting.

If, during normal operation according to the generating mode, the output speed exceeds the normal overspeed setting of the limit governor 111, because of some failure, such as a faulty basic governor or a stuck piston, for example, flyweights 250, moving outwardly, move valve member 230 toward the left, whereupon passage 213 is ported to drain 243 relieving switch 210 of pressure, signalling the electrical system of the defect. Pressure switch 211 is also relieved of pressure. Movement of the limit govenor valve member 230 as described also ports a pressure signal from passage 215 past the right end of valve member 230 to the passage 239 and the trip valve member 312, moving the valve member toward the left to a position where valve land 318 blocks passage 217, isolating the basic governor 110 from the control circuit, and at the same time connecting passages 171 and 315 to drain through reduced stem portion 320, passage 292, reduced stem portion on program valve member 271, and drain port 293. The piston and cylinder device 84 thus moves to maximum displacement, minimum speed position. Charge pressure under these conditions being ported past the right end of limit governor valve member 230, the latter is locked in its overspeed position hydraulically and will remain so until the unit is shut down and charge pressure is lost.

If, for any reason, the engine is stopped, as upon landing of the aircraft when some engines usually are stopped and others kept running, and the generator associated therewith is not taken off the line, charge pressure in lines 370 and 345 maintains sequence valve 340 locked and thereby allows the generator to overrun without putting a load on the supply machine. In such case, reverse torque valve 190 senses a pressure rise in line 101 and ports fluid to control device 84, reducing the motor swash plate angle and ultimately moving it overcenter in the opposite direction. Sequence valve 340, being locked in the upper position ports reverse torque valve line 332 to drain, leaving the valve at the low pressure setting so that no torque is transmitted to the engine from the motoring generator. Rotation of the pump 13 is reversed and the conditions resemble starting conditions but no torque is delivered to the engine.

If the engine is stopped while driving the generator, the normal operation including movement of motor swash plate overcenter ultimately results in movement of follower valve stem 264 to a position porting pressure switch 211 to drain to signal the electrical system that the load should be removed from the generator.

We claim:

1. In a drive for starting an engine: a differential gearing including an input shaft, an output shaft, gearing interconnecting the input shaft with the output shaft to drive the latter, and a control gear connected with said interconnecting gearing for varying the rate of rotation of the output shaft relative to the input shaft; a hydraulic transmission including a first hydraulic unit, means for varying the displacement of the first hydraulic unit, a second hydraulic unit, means for varying the displacement of the second hydraulic unit, and conduit means connecting the first and second hydraulic units to deliver fluid therebetween; gearing connecting the first hydraulic unit to said control gear and said second hydraulic unit to one of said shafts to control the torque of said control gear; means responsive to rotation of the input shaft for maintaining one of said displacement varying means at zero displacement while the input shaft is brought up to predetermined speed; and means responsive to pressure in said conduit means for maintaining the other displacement varying means at zero displacement while the input shaft is brought up to said predetermined speed.

2. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a pump, means for varying the displacement of the pump, a motor, means for varying the displacement of the motor, conduit means connecting the pump to deliver fluid to the motor, gearing connecting the control gear to drive the pump, gearing connecting said motor to one of said shafts, means responsive to rotation of the input shaft for maintaining the pump displacement varying means at zero displacement while the input shaft is brought up to a predetermined speed and then moving such displacement varying means to maximum displacement, and means responsive to pressure in said conduit means for maintaining the motor displacement varying means at zero displacement while the input shaft is brought up to said predetermined speed and then moving such displacement varying means to maximum displacement position.

3. The combination of claim 2, wherein said means controlling the pump displacement varying means comprises valve means normally connecting the pump displacement varying means to drain and a rotary governor driven by the input shaft and operable when the input shaft attains said predetermined speed to move the valve means to a position for supplying fluid under pressure to the pump displacement varying means.

4. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a pump, means for varying the displacement of the pump, a motor, means for varying the displacement of the motor, conduit means interconnecting the pump and the motor so that the pump delivers fluid to the motor to drive the latter and the latter returns fluid to the pump, gearing connecting the control gear to drive the pump, gearing connecting said input shaft to said motor, means responsive to rotation of the input shaft for maintaining the pump displacement varying means at zero displacement while the input shaft is brought up to a predetermined speed, and means responsive to pressure in said conduit means for maintaining the motor displacement varying means at zero displacement while the input shaft is brought up to said predetermined speed.

5. The combination defined in claim 4 wherein the motor displacement varying means is biased in one direction, and said means controlling the motor displacement varying means comprises valve means responsive to pressure increase in one of the conduits connecting the pump and motor for connecting the motor displacement varying means to drain and valve means responsive to pressure increase in the other conduit connecting the pump and motor for supplying fluid under pressure to the motor displacement varying means.

6. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a pump, means for varying the displacement of the pump in opposite directions from zero displacement, a motor, means for varying the displacement of the motor, conduit means interconnecting the pump and the motor so that the pump delivers fluid to the motor to drive the latter and the latter returns fluid to the pump, gearing connecting the control gear to drive the pump, gearing connecting said input shaft to said motor, means responsive to rotation of the input shaft for maintaining the pump displacement varying means at zero displacement while the input shaft is brought up to a predetermined speed and then moving such displacement varying means to maximum displacement, and means responsive to pressure in said conduit means for maintaining the motor displacement varying means at zero displacement while the input shaft is brought up to said predetermined speed and then moving such displacement varying means to maximum displacement position.

7. The combination of claim 6, including means responsive to pressure in the high pressure conduit connecting the pump and motor for controlling the motor displacement varying means after the input shaft has attained a predetermined speed thereby to control the torque delivered by the output shaft.

8. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a pump, means for varying the displacement of the pump, a motor, means for varying the displacement of the motor in opposite directions from zero displacement, conduit means interconnecting the pump and the motor so that the pump delivers fluid to the motor to drive the latter and the latter returns fluid to the pump, gearing connecting the control gear to drive the pump, gearing connecting one of said shafts to said motor, and valve means responsive to pressure in the high pressure conduit connecting the pump and motor for controlling the motor displacement varying means after the input shaft has attained a predetermined speed thereby to control the torque delivered by the output shaft.

9. The combination of claim 8, wherein said valve means comprises a valve member movable in opposite directions to connect the motor displacement varying means either to drain or to control fluid under pressure, spring means urging the valve member in one direction, passage means exposing the valve member to pressure in said high pressure conduit to oppose said spring means, and means for varying the compression of the spring means in proportion to vairations in displacement of the motor.

10. In a drive for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft; a hydraulic transmission including a first hydraulic unit, means for varying the displacement of the first hydraulic unit, a second hydraulic unit, means for varying the displacement of the second hydraulic unit, and conduit means connecting the first and second hydraulic units to deliver fluid therebetween; gearing connecting the first hydraulic unit to said control gear and said second hydraulic unit to one of said shafts to control the torque of said control gear; speed sensitive means responsive to rotation of the input shaft for maintaining one of said displacement varying means at zero displacement while the input shaft is brought up to predetermined speed and then moving such displacement varying means to maximum displacement; means responsive to pressure in said conduit means for maintaining the other displacement varying means at zero displacement while the input shaft is brought up to said predetermined speed and then moving such displacement varying means to maximum displacement; and valve means responsive to pressure in said conduit means after the input shaft has attained said predetermined speed for controlling the last mentioned displacement varying means to control the torque delivered by the output shaft.

11. The combination defined in claim 10, including means for establishing a low pressure torque limiting setting on said means responsive while the input shaft is brought up to said predetermined speed, and means for establishing a high pressure torque limiting setting on said means responsive after said input shaft has attained said predetermined speed.

12. The combination of claim 10, wherein said speed sensitive means controls conditioning of said valve means to establish its effectiveness when said input shaft attains said predetermined speed.

13. The combination of claim 10, including means responsive to the position of said last mentioned displacement varying means for establishing the effectiveness of said valve means.

14. In a transmisison for starting an engine, a differential gearing including an input shaft, an output shaft, gearing interconnecting the input shaft with the output shaft to drive the later, and a control gear connected with said interconnecting gearing for varying the rate of rotation of the output shaft relative to the input shaft, a pump, means for varying the displacement of the pump, a motor, means for varying the displacement of the motor, conduits interconnecting the pump and the motor so that the pump delivers fluid to the motor to drive the latter and the latter returns fluid to the pump, gearing connecting the control gear to drive the pump, gearing connecting said input shaft to the motor, speed sensitive means responsive to rotation of the input shaft for maintaining the pump displacement varying means at zero displacement while the input shaft is brought up to a predetermined speed and then moving such displacement varying means to maximum displacement, means responsive to pressure in said conduit means for maintaining the motor displacement varying means at zero displacement while the input shaft is brought up to said predetermined speed and then moving such displacement varying means to maximum displacement position comprising first valve means responsive to pressure increase in one of the conduits connecting the pump motor for connecting the motor displacement varying means to drain and second valve means responsive to pressure increase in the other conduit connecting the pump and motor for supplying fluid under pressure to the motor displacement varying means, third valve means responsive to pressure in said other conduit after the input shaft has attained said predetermined speed for controlling said motor displacement varying means to control torque delivered by the output shaft, and means responsive to said speed sensitive means for rendering said second valve means ineffecitve and said third valve means effective when the input shaft attains said predetermined speed.

15. The combination defined in claim 14, wherein the last recited means comprises a trip valve normally isolating said third valve means from said motor displacement varying means, and a follower valve responsive to the position of the motor displacement varying means and effective as the latter approaches maximum displacement to port control fluid under pressure from said speed sensitive means to said second valve means to establish a high pressure torque limiting setting thereon ineffective to control normal operation after the input shaft attains said predetermined speed and to port control fluid under pressure to said trip valve moving the latter to a position establishing communication between said third valve means and said motor displacement varying means.

16. The combination defined in claim 15, including a selectively operable valve means intermediate the follower valve and the second valve means for selectively porting control fluid under pressure to the latter to establish an intermediate pressure setting on the latter limiting torque at the output shaft to a corresponding intermediate valve.

17. In a transmission for use between a generator and an aircraft engine to transmit power in either direction between the generator and the engine for starting the engine from the generator and for driving the generator from the engine, a differential gearing including a generator connectible shaft, an engine connectible shaft, gearing interconnecting the two shafts in order to drive one from the other, a control shaft, and gearing on the control shaft connected with said interconnecting gearing for varying the rate of rotation of the output shaft of the generator connectible and engine connectible shafts relative to the rate of rotation of the input shaft thereof depending on the load imposed by the control shaft; a hydraulic transmission including a first hydraulic unit, means for varying the displacement of the first hydraulic unit, a second hydraulic unit, means for varying the displacement of the second hydraulic unit, and conduits connecting the first hydraulic unit to deliver fluid to the second hydraulic unit and the second hydraulic unit to return fluid to the first hydraulic unit; gearing connecting the first hydraulic unit to said control shaft and said second hydraulic unit to one of said connectible shafts to control the torque of said control gear; means responsive to pressure in the high pressure conduit connecting the first and second hydraulic units after said generator connectible shaft has attained a predetermined speed for controlling one of said displacement varying means to control the torque delivered by the engine connectible shaft; and means responsive to rotation of the generator connectible shaft when driven by the engine connectible shaft for controlling said one displacement varying means to maintain the generator connectible shaft at constant speed.

18. In a transmission for use between a generator and an aircraft engine to transmit power in either direction between the generator and the engine for starting the engine from the generator and for driving the generator from the engine: a differential gearing including a generator connectible shaft, an engine connectible shaft, gearing interconnecting the two shafts in order to drive one from the other, a control shaft, and gearing on the control shaft connected with said interconnecting gearing for varying the rate of rotation of the output shaft of the generator connectible and engine connectible shafts relative to the rate of rotation of the input shaft thereof depending on the load imposed by the control shaft; a hydraulic transmission including a first hydraulic unit, means for varying the displacement of the first hydraulic unit, a second hydraulic unit, means for varying the displacement of the second hydraulic unit, and conduits connecting the first hydraulic unit to deliver fluid to the second hydraulic unit and the second hydraulic unit to return fluid to the first hydraulic unit; gearing connecting the first hydraulic unit to said control gear and said second hydraulic unit to one of said connectible shafts to control the torque of said control gear; means responsive to rotation of the generator connectible shaft for maintaining the first and second hydraulic units displacement varying means at zero displacement while such shaft is brought up to predetermined speed preparatory to driving the engine connectible shaft and then moving both displacement varying means to maximum displacement position; means responsive to pressure in the high pressure conduit connecting the first and second hydraulic units after said generator connectible shaft has attained said predetermined speed for controlling one of said displacement varying means to control the speed and torque delivered by the engine connectible shaft; and means responsive to rotation of the generator connectible shaft when driven by the engine connectible shaft for controlling said one displacement varying means to maintain the generator connectible shaft at constant speed.

19. In a transmission for use between a generator and an aircraft engine to transmit power in either direction between the generator and the engine for starting the engine from the generator and for driving the generator from the engine, a differential gearing including a generator connectible shaft, an engine connectible shaft, gearing interconnecting the two shafts in order to drive one from the other, a control shaft, and gearing on the control shaft connecting with said interconnecting gearing for varying the rate of rotation of the output shaft of the generator connectible and engine connectible shafts relative to the rate of rotation of the input shaft thereof depending on the load imposed by the control shaft, a pump, means for varying the displacement of the pump in opposite directions from zero displacement, a motor, means for varying the displacement of the motor, conduit means interconnecting the pump and the motor so that the pump delivers fluid to the motor to drive the latter and the latter returns fluid to the pump, gearing connecting the control shaft to drive the pump gearing connecting said generator connectible shaft to said motor; means responsive to rotation of the generator connectible shaft for maintaining the pump and motor displacement varying means at zero displacement while such shaft is brought up to predetermined speed preparatory to driving the engine connectible shaft and then moving both displacement varying means to maximum displacement position; means responsive to pressure in the high pressure conduit connecting the pump and motor after said generator connectible shaft has attained said predetermined speed for controlling said motor displacement varying means to control the speed and torque delivered by the engine connectible shaft; and means responsive to rotation of the generator connectible shaft when driven by the engine connectible shaft for controlling said motor displacement varying means to maintain the generator connectible shaft at a constant speed.

20. In a transmission for use between a generator and an aircraft engine to transmit power in either direction between the generator and the engine for starting the engine from the generator and for driving the generator from the engine, a differential gearing including a generator connectible shaft, an engine connectible shaft, gearing interconnecting the two shafts in order to drive one from the other, a control shaft, and gearing on the control shaft connected with said interconnecting gearing for varying the rate of rotation of the output shaft of the generator connectible and engine connectible shafts relative to the rate of rotation of the input shaft thereof depending on the load imposed by the control shaft, a pump, means for varying the displacement of the pump in opposite directions from zero displacement, a motor, means for varying the displacement of the motor, conduit means interconnecting the pump and the motor so that the pump delivers fluid to the motor to drive the latter and the latter returns fluid to the pump, gearing connecting the control shaft to drive the pump, gearing connecting the motor and the generator connectible shaft, means responsive to rotation of the generator connectible shaft for maintaining the pump and motor displacement varying means at zero displacement while such shaft is brought up to predetermined speed preparatory to driving the engine connectible shaft and then moving both displacement varying means to maximum displacement position; means responsive to pressure in the high pressure conduit connecting the pump and motor after said generator connectible shaft has attained said predetermined speed for controlling said motor displacement varying means in one direction from zero displacement to control the torque delivered by the engine connectible shaft; and means responsive to rotation of the generator connectible shaft when driven by the engine connectible shaft for controlling said motor displacement varying means in the opposite direction from zero displacement to maintain the generator connectible shaft at constant speed.

21. In a transmission for use between a generator and an aircraft engine to transmit power in either direction between the generator and the engine for starting the engine from the generator and for driving the generator from the engine: a differential gearing including a generator connectible shaft, an engine connectible shaft, gearing interconnecting the two shafts to drive one from the other, and a control gear connected with said interconnecting gearing for varying the rate of rotation of the output shaft of the generator connectible and engine connectible shafts relative to the rate of rotation of the input shaft thereof depending on the load imposed by the control shaft; a hydraulic transmission including a first hydraulic unit, a second hydraulic unit, and conduits connecting the first and second hydraulic units so that the first hydraulic unit delivers fluid to the second hydraulic unit and the latter returns fluid to the first hydraulic unit; gearing connecting the first hydraulic unit to said control gear and said second hydraulic unit to one of said connectible shafts to control the torque of said control gear; first means responsive to rotation of the generator connectible shaft for maintaining one hydraulic unit at zero displacement while such shaft is brought up to predetermined speed preparatory to driving the engine connectible shaft and then moving such unit to maximum displacement position; second means responsive to pressure in the conduits connecting the hydraulic units for maintaining the other hydraulic unit at zero displacement while the generator connectible shaft is brought up to said predetermined speed and then moving such unit to maximum displacement; third means responsive to pressure in the high pressure conduit connecting the hydraulic units after said generator connectible shaft has attained said predetermined speed for controlling displacement of said other unit in one direction to control the torque delivered by the engine connectible shaft; and fourth means responsive to rotation of the generator connectible shaft when driven by the engine connectible shaft for controlling displacement of said other unit in the opposite direction to maintain the generator connectible shaft at constant speed; said second responsive means comprising first valve means responsive to pressure in one of said conduits and second valve means responsive to pressure in the other of said conduits, means establishing a low pressure torque limiting setting on both valve means while the generator connectible shaft is brought up to said predetermined speed, means responsive to movement of said other unit to maximum displacement in said one direction for establishing a high pressure torque limiting setting on one of said valve means after said generator connectible shaft has attained said predetermined speed, and means responsive to movement of said other unit through zero displacement for establishing a high pressure torque limiting setting on said other valve means when the generator connectible shaft is driven by the engine connectible shaft.

22. In a transmission for use between a generator and an aircraft engine to transmit power in either direction between the generator and the engine for starting the engine from the generator and for driving the generator from the engine: a differential gearing including a generator connectible shaft, an engine connectible shaft, gearing interconnecting the two shafts to drive one from the other, and a control gear connected with said interconnecting gearing for varying the rate of rotation of the output shaft of the generator connectible and engine connectible shafts relative to the rate of rotation of the input shaft thereof depending on the load imposed by the control shaft; a hydraulic transmission including a first hydraulic unit, means for varying the displacement of the first hydraulic unit, a second hydraulic unit, means for varying the displacement of the second hydraulic unit, and conduits connecting the first and second hydraulic units so that the first hydraulic unit delivers fluid to the second hydraulic unit and the latter returns fluid to the first hydraulic unit; gearing connecting the first hydraulic unit to said control gear and said second hydraulic unit to one of said connectible shafts to control the torque of said control gear; first means responsive to rotation of the generator connectible shaft for maintaining one hydraulic unit at zero displacement while such shaft is brought up to predetermined speed preparatory to driving the engine connectible shaft and then moving such unit to maximum displacement position; second means responsive to pressure in the conduits connecting the hydraulic units for maintaining the other hydraulic unit at zero displacement while the generator connectible shaft is brought up to said predetermined speed and then moving such unit to maximum displacement in one direction; third means responsive to pressure in the high pressure conduit connecting the hydraulic units after said generator connectible shaft has attained said predetermined speed for controlling displacement of said other unit in said one direction to control the torque delivered by the engine connectible shaft; fourth means responsive to rotation of the generator connectible shaft when driven by the engine connectible shaft for controlling displacement of said other unit in the opposite direction to maintain the generator connectible shaft at constant speed; and valve means responsive to movement of said other unit through zero displacement for locking said one unit at maximum displacement.

23. In a transmission for use between a generator and an aircraft engine to transmit power in either direction between the generator and the engine for starting the engine from the generator and for driving the generator from the engine: a differential gearing including a generator connectible shaft, an engine connectible shaft, gearing interconnecting the two shafts to drive one from the other, and a control gear connected with said interconnecting gearing for varying the rate of rotation of the output shaft of the generator connectible and engine connectible shafts relative to the rate of rotaion of the input shaft thereof depending on the load imposed by the control shaft; a hydraulic transmission including a first hydraulic unit, a second hydraulic unit, conduits connecting the first hydraulic unit and the second hydraulic unit so that the first hydraulic unit delivers fluid to the second hydraulic unit and the latter returns fluid to the first hydraulic unit; gearing connecting the first hydraulic unit to said control gear and said second hydraulic unit to one of said connectible shafts to control the torque of said control gear; first means responsive to rotation of the generator connectible shaft for maintaining one hydraulic unit at zero displacement while such shaft is brought up to predetermined speed preparatory to driving the engine connectible shaft and then moving such unit to maximum displacement position; second means responsive to pressure in the conduits connecting the hydraulic units for maintaining the other hydraulic unit at zero displacement while the generator connectible shaft is brought up to said predetermined speed; third means responsive to pressure in the high pressure conduit connecting the hydraulic units after said generator connectible shaft has attained said predetermined speed for controlling displacement of said other unit in one direction to control the torque delivered by the engine connectible shaft; fourth means responsive to rotation of the generator connectible shaft when driven by the engine connectible shaft for controlling displacement of said other unit in the opposite direction to maintain the generator connectible shaft at constant speed; and means responsive to movement of said other unit between zero displacement and maximum displacement in said one direction for isolating said fourth means while said third means is operative and isolating said third means while said fourth means is operative.

24. In a transmission for use between a generator and an aircraft engine to transmit power in either direction between the generator and the engine for starting the engine from the generator and for driving the generator from the engine: a differential gearing including a generator connectible shaft, an engine connectible shaft, gearing interconnecting the two shafts to drive one from the other, and a control gear connected with said interconnecting gearing for varying the rate of rotation of the output shaft of the generator connectible and engine connectible shafts relative to the rate of rotation of the input shaft thereof depending on the load imposed by the control shaft; a hydraulic transmission including a first hydraulic unit, a second hydraulic unit, conduits connecting the first hydraulic unit and the second hydraulic unit so that the first hydraulic unit delivers fluid to the second hydraulic unit and the latter returns fluid to the first hydraulic unit; gearing connecting the first hydraulic unit to said control gear and said second hydraulic unit to one of said connectible shafts to control the torque of said control gear; first means responsive to rotation of the generator connectible shaft for maintaining one hydraulic unit at zero displacement while such shaft is brought up to predetermined speed preparatory to driving the engine connectible shaft and then moving such unit to maximum displacement position; second means responsive to pressure in the conduits connecting the hydraulic units for maintaining the other hydraulic unit at zero displacement while the generator connectible shaft is brought up to said predetermined speed; third means responsive to pressure in the high pressure conduit connecting the hydraulic units after said generator connectible shaft has attained said predetermined speed for controlling displacement of said other unit in one direction to control the torque delivered by the engine connectible shaft; fourth means responsive to rotation of the generator connectible shaft when driven by the engine connectible shaft for controlling displacement of said other unit in the opposite direction to maintain the generator connectible shaft at constant speed; pressure sensitive switch means for sending an overspeed signal outside the transmission, speed sensitive means responsive to rotation of the generator connectible shaft for porting fluid to said switch means in event of overspeed not compensable in the transmission, means establishing a normal predetermined overspeed setting of said speed sensitive means effective while said fourth means is operative, and means responsive to pressure in the high pressure conduit while said third means is operative for establishing a higher overspeed setting of said speed sensitive means.

25. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a pump, a variable displacement motor, conduit means interconnecting the pump and motor so that the pump delivers fluid to the motor, gearing connecting the control gear to drive the pump so that when the pump applies a load to the control gear torque is applied to the output shaft and the speed of the pump is reduced as the speed of the output shaft increases, gearing connecting the motor to the input shaft so that when the input shaft is driven at a constant speed the motor rotates at a constant speed, means for varying the displacement of the motor, means for moving the displacement varying means toward maximum displacement position when the input shaft attains constant speed thereby to impose a load on said pump and apply torque to the output shaft, yieldably biased valve means responsive to pressure in said conduit means for controlling said displacement varying means while said input shaft rotates at constant speed, and means responsive to the position of said displacement varying means for controlling the bias on said valve means, thereby to control the torque delivered to the output shaft.

26. A combination as defined in claim 25, said valve means responding to pressure in said conduit means and controlling said displacement varying means to maintain pressure in the conduit means constant for a particular setting of the bias on said valve means by moving said displacement varying means toward minimum displacement position, and said means controlling the bias on said valve means maintaining the bias constant for a predetermined movement of the displacement varying means toward minimum displacement, thereby to maintain constant torque at the output shaft, and then reducing the bias on said valve means thereby to reduce the torque delivered to the output shaft.

27. In a drive unit for use between a generator and an aircraft engine to transmit power from the generator, functioning as a motor, to the engine for starting the engine or for cranking the engine without starting, a generator connectible shaft, an engine connectible shaft, a differential gearing connected between said shafts, a control gear in said differential gearing, a hydraulic transmission connecting said control gear and one of said shafts, a control system including a pressure responsive valve for controlling the hydraulic transmission thereby to control the torque delivered to the engine connectible shaft during starting and during cranking without starting, means for establishing a high pressure setting on said pressure responsive valve for engine starting, and a selectively controllable motoring valve for establishing a low pressure setting on said pressure responsive valve thereby to provide reduced torque to the engine connectible shaft for cranking the engine without starting.

28. In a drive unit for use between a generator and an aircraft engine to transmit power in either direction between the generator and engine, from the generator, functioning as a motor, to the engine for starting the engine and from the engine to the generator to drive the latter, and adapted to permit engine starting from an independent source, a generator connectible shaft, an engine connectible shaft, a differential gearing having a control gear connected between said shafts, a hydraulic transmission connecting said control gear and one of said shafts connecting the shafts, a charge pump driven by the generator connectible shaft for supplying control fluid while starting the engine from the generator connectible shaft, a start pump driven by the engine connectible shaft for supplying control fluid while starting the engine from an independent source, a control system for normally utilizing fluid from the charge pump for engine starting by the generator to control the hydraulic transmission thereby to control torque delivered to the engine, and sequence valve means responsive to pressure from the start pump and positionable by the latter while starting the engine from an independent source to port control fluid to the control system for controlling the hydraulic transmission thereby to control the speed of the generator connectible shaft.

29. In a drive unit for use between a generator and an aircraft engine to transmit power in either direction between the generator and engine, from the generator, functioning as a motor, to the engine for starting the engine, and from the engine to the generator to drive the latter, and adapted to permit engine starting from an independent source: a differential including a generator connectible shaft, an engine connectible shaft, gearing interconnecting the two shafts to drive either from the other, and a control gear for varying the rate of rotation of the driven shaft of the two relative to driving shaft; a hydraulic transmission including a reversely rotatable pump, a motor, means for varying the displacement of the motor in opposite directions from neutral, and conduits connecting the pump and motor in closed circuit; gearing connecting the control gear to drive the pump, gearing connecting the motor output to the generator connectible shaft, a charge pump driven by the generator connectible shaft for supplying control fluid while starting the engine from the generator connectible shaft, a start pump driven by the engine connectible shaft for supplying control fluid while starting the engine from an independent source, a control system for normally utilizing fluid from the charge pump for engine starting by the generator to control the displacement varying means thereby to control torque delivered to the engine, and sequence valve means responsive to pressure from the charge pump and the start pump and positionable by the latter while starting the engine from an independent source to port control fluid to the control system for controlling the displacement varying means thereby to control the speed of the generator connectible shaft.

30. In a drive unit for use between a generator and an aircraft engine to transmit power in either direction between the generator and engine, from the generator, functioning as a motor, to the engine for starting the engine and from the engine to the generator to drive the latter, a generator connectible shaft, an engine connectible shaft, a hydraulic transmission connecting the shafts, a pressure responsive system for controlling the hydraulic transmission during engine starting to control transmission pressure and thereby control the torque delivered to the engine including a pressure limiting valve, a speed responsive system for controlling the hydraulic transmission during generating thereby to control the speed of the generator connectible shaft, and sequence valve means establishing a high pressure setting on said pressure limiting valve during engine starting and responsive to the changeover from the starting mode to the generating mode for establising a low pressure setting on said pressure limiting valve during generating and maintaining such low pressure setting during engine stoppage so that if the generator is driven as a motor during such engine stoppage hydraulic transmission pressure is limited to a value incapable of delivering torque to the engine connectible shaft.

31. In a drive unit for use between a generator and an aircraft engine to transmit power in either direction between the generator and engine, from the generator, functioning as a motor, to the engine for starting the engine, and from the engine to the generator to drive the latter: a differential including a generator connectible shaft, an engine connectible shaft, gearing interconnecting the two shafts to drive either from the other, and a control gear for varying the rate of rotation of the driven shaft of the two relative to the driving shaft; a hydraulic transmission including a pump rotatable in opposite directions, a motor, means for varying the displacement of the motor in opposite directions from neutral, and conduits connecting the pump and motor in closed circuit; gearing connecting the control gear to drive the pump, gearing connecting the motor output to the generator connectible shaft, means for controlling the displacement varying means during engine starting and during engine stoppage to control the torque applied to the engine connectible shaft and the speed thereof, a pressure switch, and valve means responsive to the position of the displacement varying means for controlling the supply of control fluid to said pressure switch thereby to provide an electrical signal indicative of the speed of the enigne connectible shaft.

32. A combination as defined in claim 31, wherein said valve means ports said pressure switch to drain during engine stoppage to provide an electrical signal indicating that the load should be removed from the generator connectible shaft.

33. A combination as defined in claim 31, wherein said valve means ports control fluid under pressure to said pressure switch on engine starting when the engine connectible shaft reaches a predetermined speed thereby to provide an electrical signal indicative that a load may be applied to the generator connectible shaft.

34. In a transmission for starting an engine, a differential gearing including an input shaft, an output shaft, gearing interconnecting the input with the output shaft to drive the latter, and a control gear connected with said interconnected gearing for varying the rate of rotation of said output shaft relative to said input shaft, a first variable displacement hydraulic unit, a second variable displacement hydraulic unit, conduit means interconnecting said first and second units, gearing connecting said control gear to one of said units, gearing connecting the other of said units to one of said shafts, means for placing said first and second variable displacement units at substantially zero displacement in order to bring the input shaft up to speed prior to the imposition of a load thereon, means for placing said first and second hydraulic units at maximum displacement in response to a predetermined speed of said input shaft in order to provide maximum torque at the output shaft; a predetermined torque program, means responsive to said predetermined torque program for varying the displacement of one of said hydraulic units from said maximum displacement toward minimum displacement in order to control the torque and speed at the output shaft.

35. In a transmission for starting an engine, a differential gearing including an input shaft, an output shaft, gearing interconnecting the input shaft with the output shaft to drive the latter, and a control gear connected with said interconnecting gearing for varying the rate of rotation of the output shaft relative to the input shaft, a first hydraulic unit, means for varying the displacement of said first hydraulic unit, a second hydraulic unit, means for varying the displacement of said second hydraulic unit, conduit means interconnecting said first and second hydraulic units to deliver fluid therebetween, gearing connecting the control gear to drive said first hydraulic unit, gearing connecting said second hydraulic unit to one of said shafts, means responsive to rotation of the input shaft for maintaining said first unit displacement varying means at zero displacement while the input shaft is brought up to a predetermined speed and then moving such displacement varying means to maximum displacement, and means responsive to pressure in said conduit means for maintaining said second unit displacement varying means at zero displacement while the input shaft is brought up to said predetermined speed and then moving such displacement varying means to maximum displacement position.

36. In a transmission for starting an engine, differential gearing including an input shaft, an output shaft, gearing interconnecting the input shaft with the output shaft to drive the latter, and a control gear connected with said interconnecting gearing for varying the rate of rotation of the output shaft relative to the input shaft, a first hydraulic unit, means for varying the displacement of said first hydraulic unit, a second hydraulic unit, means for varying the displacement of said second hydraulic unit, conduit means interconnecting said hydraulic units to deliver fluid therebetween, gearing connecting the control gear to drive said first hydraulic unit, gearing connecting one of said shafts to said second hydraulic unit, speed sensitive means responsive to rotation of the input shaft for maintaining one of said displacement varying means at zero displacement while the input shaft is brought up to a predetermined speed and then moving said displacement varying means to maximum displacement, means responsive to pressure in said conduit means for maintaining the other displacement varying means at zero displacement while the input shaft is brought up to said predetermined speed and then moving such other displacement varying means to maximum displacement position comprising first valve means responsive to pressure increase in one of said conduits for connecting said other displacement varying means to drain and second valve means responsive to pressure increase in the other conduit for supplying fluid under pressure to said other displacement varying means, a predetermined torque program, means responsive to said predetermined torque program after the input shaft has attained said predetermined speed for controlling said other displacement varying means to control torque delivered by the output shaft, and means responsive to said speed sensitive means for rendering said second valve means ineffective and said means responsive to the predetermined torque program effective when the input shaft attains said predetermined speed.

37. In a transmission for use between a generator and an engine to transmit power in either direction between the generator and the engine for starting the engine from the generator and for driving the generator from the engine, a differential gearing including a generator connectible shaft, an engine connectible shaft, gearing connecting the two shafts in order to drive one from the other, a control shaft, and gearing on the control shaft connected with said interconnecting gearing for varying the rate of rotation of the output shaft of the generator connectible shaft and the engine connectible shaft relative to the rate of rotation of the input shaft thereof depending on the load imposed by the control shaft; a first hydraulic unit, means for varying the displacement of said first hydraulic unit, a second hydraulic unit, means for varying the displacement of said second hydraulic unit, conduit means interconnecting said first and second hydraulic units to deliver fluid therebetween, either of said conduits being capable of being under pressure so that torque can be transmitted in either direction from one hydraulic unit to the other; gearing connecting one of said hydraulic units to said control shaft to control the torque of said control gear, gearing connecting one of said shafts to the other hydraulic unit; a predetermined torque program, means responsive to said predetermined torque program after said generator connectible shaft has attained a predetermined speed for controlling one of said displacement varying means to control the torque delivered by the engine connectible shaft; and means responsive to rotation of the generator connectible shaft when driven by the engine connectible shaft for controlling said one displacement varying means to maintain the generator connectible shaft at constant speed.

38. In a transmission for use between a generator and an engine to transmit power in either direction between the generator and the engine for starting the engine from the generator and for driving the generator from the engine, differential gearing including a generator connectible shaft, an engine connectible shaft, gearing interconnecting the two shafts in order to drive one from the other, a control shaft, and gearing on the control shaft connected with said interconnecting gearing for varying the rate of rotation of the generator connectible shaft relative to the engine connectible shaft depending on the load imposed by the control shaft, a first hydraulic unit, means for varying the displacement of said first hydraulic unit, a second hydraulic unit, means for varying the displacement of said second hydraulic unit, conduit means interconnecting said first and second hydraulic units so that torque may be delivered in either direction therebetween, gearing connecting the control shaft to one of said hydraulic units, gearing connecting one of said connectible shafts to the other hydraulic unit, means responsive to rotation of the generator connectible shaft for maintaining one of said hydraulic units at zero displacement while such shaft is brought up to predetermined speed preparatory to driving the engine connectible shaft and then moving both displacement varying means to maximum displacement positions in one direction; a predetermined torque program, means responsive to said predetermined torque program after said generator connectible shaft has attained said predetermined speed for controlling one of said displacement varying means in one direction from zero displacement to control the torque delivered by the engine connectible shaft; and means responsive to rotation of the generator connectible shaft for controlling said one displacement varying means in the opposite direction from zero displacement to maintain the generator connectible shaft at constant speed.

39. A transmission for use between a generator and an engine to transmit power in either direction between the generator and the engine for starting the engine from the generator for driving the generator from the engine: a differential gearing including a generator connectible shaft, an engine connectible shaft, gearing interconnecting the two shafts to drive one from the other, and a control gear connected with said interconnecting gearing for varying the rate of rotation of the generator connectible shaft relative to said engine connectible shaft depending upon the load imposed by the control shaft; a first hydraulic unit, a second hydraulic unit, conduits interconnecting said first and second hydraulic units so that either hydraulic unit may deliver and receive fluid from the other; gearing connecting the control shaft to one of said hydraulic units to control the torque of said control gear, and gearing connecting one of said connectible shafts to said other hydraulic unit; first means responsive to rotation of the generator connectible shaft for maintaining one hydraulic unit at zero displacement while such shaft is brought up to predetermined speed preparatory to driving the engine connectible shaft and then moving said unit to maximum displacement position; second means responsive to pressure in the conduits connecting said first and second hydraulic units for maintaining the other hydraulic unit at zero displacement while the generator connectible shaft is brought up to said predetermined speed and then moving such unit to maxium displacement; a predetermined torque program, third means responsive to said predetermined torque program after said generator connectible shaft has attained said predetermined speed for controlling displacement of said other hydraulic unit in one direction to control the torque delivered by the engine connectible shaft; and fourth means responsive to roatation of the generator connectible shaft when driven by the engine connectible shaft for controlling displacement of said other hydraulic unit in the opposite direction to maintain the generator connectible shaft at constant speed; said second responsive means comprising first valve means responsive to pressure in one of said conduits and second valve means responsive to pressure in the other of said conduits, means establishing the low pressure torque limiting setting on both said valve means while the generator connectible shaft is brought up to said predetermined speed, means responsive to movement of said other hydraulic unit to maximum displacement in said one direction for establishing a high pressure torque limiting setting on one of said valve means after said generator connectible shaft has attained said predetermined speed, and means responsive to movement of said other hydraulic unit through zero displacement for establishing a high pressure torque limiting setting on the other of said valve means when the generator connectible shaft is driven by the engine connectible shaft.

40. In a drive unit for use between an engine and a generator to transmit power from the engine to the generator and for maintaining a constant generator speed: an input shaft adapted to be driven by said engine, an output shaft adapted to drive said generator, a first hydraulic unit connected to said input shaft, a second hydraulic unit connected to said output shaft, two conduits interconnecting said first and second hydraulic units, one of said conduits normally delivering high pressure fluid, means responsive to the speed of said output shaft for controlling the displacement of one of said hydraulic units to maintain a constant output shaft speed, limit means for rendering said speed responsive means inoperative when said ouput shaft speed exceeds a predetermined overspeed, a reverse torque valve responsive to pressure increase in the other of said conduits for incrasing the speed of said second hydraulic unit and nullifying the effect of the speed responsive means to decrease the speed of the second hydraulic unit, and means responsive to pressure in said other conduit for rendering inoperative said limit means in response to an increase in pressure in said other conduit, thereby permitting the generator to overspeed when driven from an external source other than its associated engine without imposing a load on the other source by the normal control of the speed responsive means.

References Cited by the Examiner
UNITED STATES PATENTS

| | | | |
|---|---|---|---|
| 2,173,856 | 9/1939 | Orshansky | 74—687 |
| 2,296,929 | 9/1942 | Ifield | 74—687 |
| 2,557,933 | 6/1951 | Beaman et al. | 123—179 X |
| 2,730,182 | 1/1956 | Sloane | 74—714 X |
| 2,908,189 | 10/1959 | Parker et al. | 74—675 |
| 2,917,948 | 12/1959 | Nussbaumer | 74—687 |
| 2,931,250 | 4/1960 | Ebert | 74—687 |
| 3,004,450 | 10/1961 | Garnier | 74—687 |
| 3,055,233 | 9/1962 | Giles | 74—687 |
| 3,074,296 | 1/1963 | Ebert | 74—687 |
| 3,095,757 | 7/1963 | Thoma | 74—687 |

OTHER REFERENCES

S.A.E. Journal, March 1961, pp. 64–66.

DAVID J. WILLIAMOWSKY, *Primary Examiner.*

DON A. WAITE, *Examiner.*

T. C. PERRY, *Assistant Examiner.*